(12) United States Patent
Bemis et al.

(10) Patent No.: US 8,214,931 B2
(45) Date of Patent: Jul. 10, 2012

(54) TOILET SEAT HINGE AND METHOD OF MANUFACTURE

(75) Inventors: Peter F. Bemis, Elkhart Lake, WI (US); Joseph Hand, Sheboygan, WI (US); Randy Hulsebus, Plymouth, WI (US); Gary Vande Berg, Fox Lake, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 1306 days.

(21) Appl. No.: 11/871,460

(22) Filed: Oct. 12, 2007

(65) Prior Publication Data

US 2009/0106884 A1    Apr. 30, 2009

Related U.S. Application Data

(60) Provisional application No. 60/829,429, filed on Oct. 13, 2006.

(51) Int. Cl.
*A47K 13/12* (2006.01)
(52) U.S. Cl. .................................. 4/236; 4/234
(58) Field of Classification Search .............. 4/234, 236, 4/237, 240
See application file for complete search history.

(56) References Cited

U.S. PATENT DOCUMENTS

| | | | |
|---|---|---|---|
| 2,252,196 A | 8/1941 | Parsons | |
| 3,277,500 A | 10/1966 | Carlson | |
| 3,447,169 A * | 6/1969 | Watson | 4/240 |
| 3,754,300 A | 8/1973 | Shepherd | |
| 4,319,365 A | 3/1982 | Bemis et al. | |
| 4,391,001 A | 7/1983 | Harrison | |
| 4,514,356 A | 4/1985 | Harrison | |
| 4,729,134 A * | 3/1988 | Hillebrand et al. | 4/236 |
| 4,742,582 A | 5/1988 | Giallourakis | |
| 4,877,672 A * | 10/1989 | Shreiner | 428/156 |
| 4,939,796 A * | 7/1990 | Pepper | 4/236 |
| 4,965,890 A * | 10/1990 | Fischer | 4/240 |
| 4,974,262 A * | 12/1990 | Rosen | 4/236 |

FOREIGN PATENT DOCUMENTS

| | | |
|---|---|---|
| DE | 10250765 | 5/2004 |
| GB | 2124294 | 2/1984 |
| NZ | 1069484 | 8/1963 |

OTHER PUBLICATIONS

PCT/US2007/081199 International Search Report and Written Opinion dated Mar. 25, 2008.

* cited by examiner

*Primary Examiner* — Davis Hwu
(74) *Attorney, Agent, or Firm* — Michael Best & Friedrich LLP

(57) ABSTRACT

A toilet assembly comprising: a toilet bowl; a toilet seat; and a hinge pivotally connecting the toilet seat to the toilet bowl, the hinge including a base portion connected to the toilet bowl, the base portion being made of a relatively rigid material; a leaf portion connected to the toilet seat, the leaf portion being made of a relatively rigid material; and a living hinge portion pivotally connecting the base portion to the leaf portion, the living hinge portion being made of a relatively flexible material.

28 Claims, 23 Drawing Sheets

TOILET SEAT HINGE AND METHOD OF MANUFACTURE

CROSS-REFERENCE TO RELATED APPLICATION

This application claims priority from U.S. Provisional Patent Application No. 60/829,429, filed Oct. 13, 2006, the entire contents of which are incorporated herein by reference.

BACKGROUND OF THE INVENTION

The invention relates to toilet seat hinges, to living hinges, and to injection molding technology.

Single-material living hinges are decades old. A single-material living hinge has only one material forming both the portions being pivotally connected and the flexible connecting portion. U.S. Pat. No. 4,939,796, assigned to the assignee hereof, discloses a toilet seat hinge with a single-material living hinge. Typically using olefinic materials, these hinges can be found on a variety of products. More recent are products produced using two materials, i.e., two-material living hinges. Common to the office furniture and fenestration markets, these two-component designs have been almost entirely manufactured using the extrusion method of plastic processing. These latter applications were necessary because of the typical cracking/delamination of olefinic living hinges due to manufacturing and material variables during processing inevitably leading to breakage. This is typically found where repeated flexing has been anticipated as a due course in the life of the product.

The assignee's experience with toilet seat hinge caps incorporating a flexible hinge concept is typical of this problem. When the cap was opened repeatedly to tighten the hinge-to-china bolts it was common to have the living hinge crack or delaminate.

Two-component injection molding is newer still. Although this process has been common for the last ten years or so, the inclusion of a second material has been most commonly used for the purpose of providing a soft touch or friendly feel to a product. This has been primarily accomplished through the process of overmolding onto the structural portion of the product. A second, far less common type of two-component injection molding has been the co-injection process. In this process a skin is molded over a core of similar or dissimilar material forming a three-layer part. This process is used primarily to lower the use of prime or virgin material in the final part makeup to reduce cost. Co-injection can only be done with a two barrel specifically designed machine.

SUMMARY OF THE INVENTION

The invention provides an improved toilet seat hinge.

In one aspect of the invention, the hinge is made of two different materials, with a rigid portion to be attached to a toilet and a flexible portion forming a living hinge. Preferably, the living hinge is made of a thermoplastic elastomer.

In another aspect of the invention, the toilet seat hinge has flexible or compressible material on the bottom of the hinge. The bottom material can be the same as or different from the hinge structural or living hinge material.

The invention also provides an improved method of injection molding an object made of at least two materials. Preferably, the method is used to manufacture a toilet seat hinge with a living hinge made of a thermoplastic elastomer.

In one aspect of the invention, a toilet seat hinge is injection molded with a rigid portion of one material and a flexible portion of another material. Two separate molds are used at two separate times to make the hinge. The rigid portion is injected in one mold and then moved to another mold where the flexible portion is injected.

In one aspect of the invention, a toilet seat hinge is injection molded with a rigid portion of one material and a flexible portion of another material. This uses one mold with a cavity for molding the rigid material and a cavity for overmolding the flexible material. The part is transferred from the first cavity to the second cavity.

In one aspect of the invention, a toilet seat hinge is injection molded with a rigid portion of one material and a flexible portion of another material. This uses one mold with a cavity for molding the rigid material and a cavity for overmolding the flexible material. The part is rotated from the first cavity to the second cavity.

In one aspect of the invention, a toilet seat hinge is injection molded with a rigid portion of one material and a flexible portion of another material. This uses a single mold cavity with retractable cores in the spaces where the flexible material is eventually injected. The rigid material is injected with the cores in position, so that the rigid material does not fill the spaces where the flexible material is eventually injected. Then the cores are retracted and the flexible material is injected into the vacated spaces.

The proposed hinge design eliminates the problems associated with using one material to provide both the basic strength of the hinge and its flexibility. The problem or fear associated with prior designs is that over time the inevitable cracking/delamination of the single material design would in all probability lead to a failure. By using a thermoplastic elastomer to provide for continuous use flexing and a commodity plastic to provide the necessary structure, a near lifetime hinge is created for any compression molded toilet seat. The introduction of materials picked specifically to do inherently different tasks in a single hinge sets this design apart from prior approaches.

As second less obvious advantage of the new design is the ability to select the two materials from a much broader raw material offering. With a single material design it is necessary to provide a material that is both stiff enough to meet the strength requirements yet flexible enough to provide the living hinge. These two features of one material are at cross purposes and can lead to compromise. This issue does not exist with a two material hinge.

Another advantage is the incorporation of a flexible material on the bottom of the hinge. One of the constant irritants to current hinge designs is the periodic need to retighten the bolts to keep the hinge secure to the vitreous china. It is likely that the addition of a layer of compressible material underneath the hinge would keep the nut and bolt tighter longer and, even when loose, would provide a tackier surface against the china reducing surface slip.

Finally, the preferred method of manufacture of this multimaterial hinge is different than traditional methods. Using some methods would be difficult given the fact that the two soft material areas combine three separate parts. If the three parts are moved into a second cavity in the tool to overmold the flexible material onto their surfaces, considerable care must be taken to assure that alignment of the three parts is near perfect. Thin areas of the flexible material or any warpage of the three parts could easily lead to part failure. This could be overcome by rotating the parts. However, this is expensive from either a machine or tooling standpoint and adds to cycle time. The preferred method provides a separate channel for the second barrel to fill the part after a pulled core area has provided the necessary space for the flexible material to fill.

This eliminates the problems associated with moving the parts or rotating them because the parts molded originally are not moved until ejection.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DESCRIPTION OF THE PREFERRED EMBODIMENT

Figure 1:
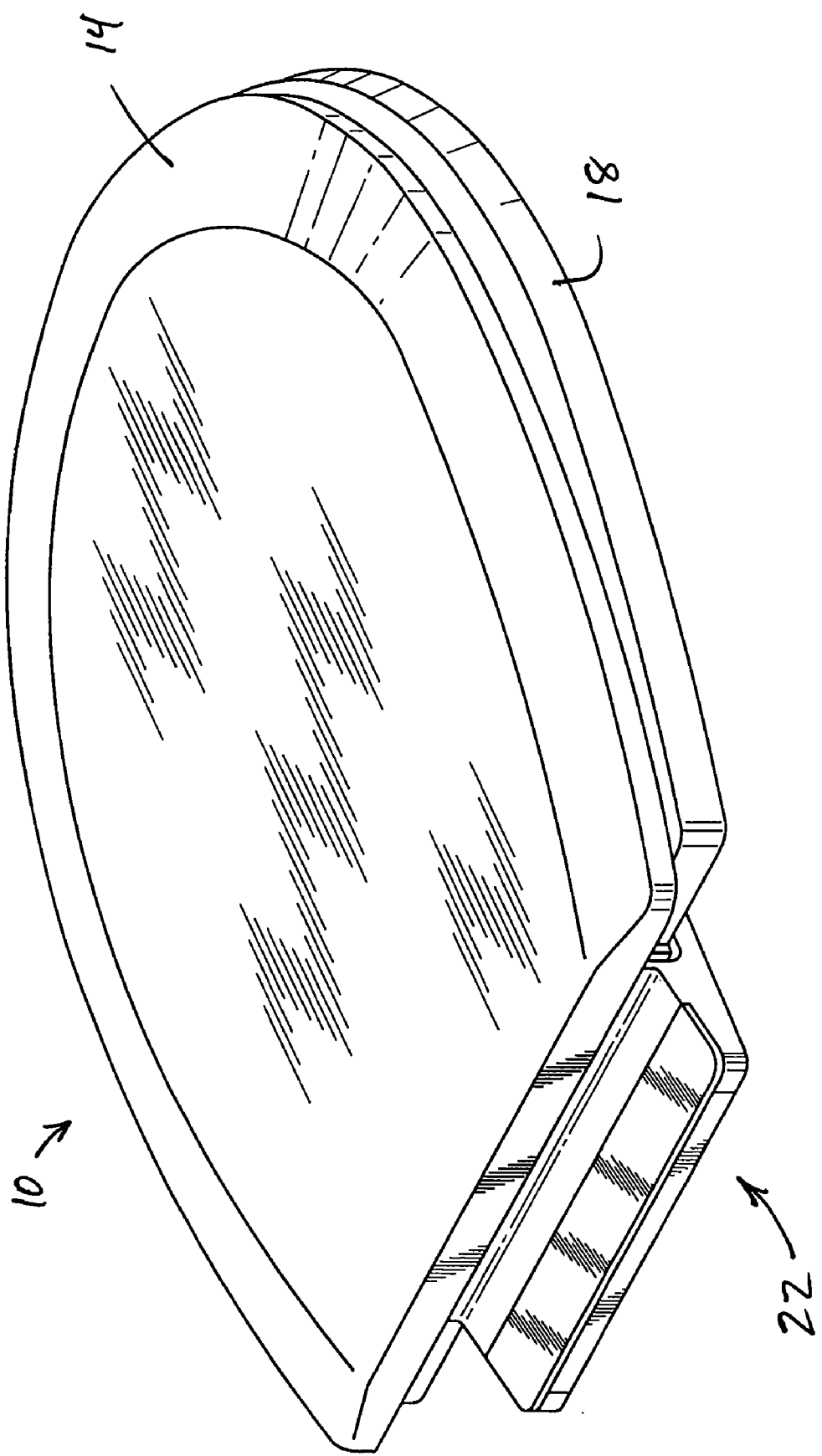
FIG. 1 is a perspective view of a toilet seat including a hinge embodying the invention.
Figure 2:
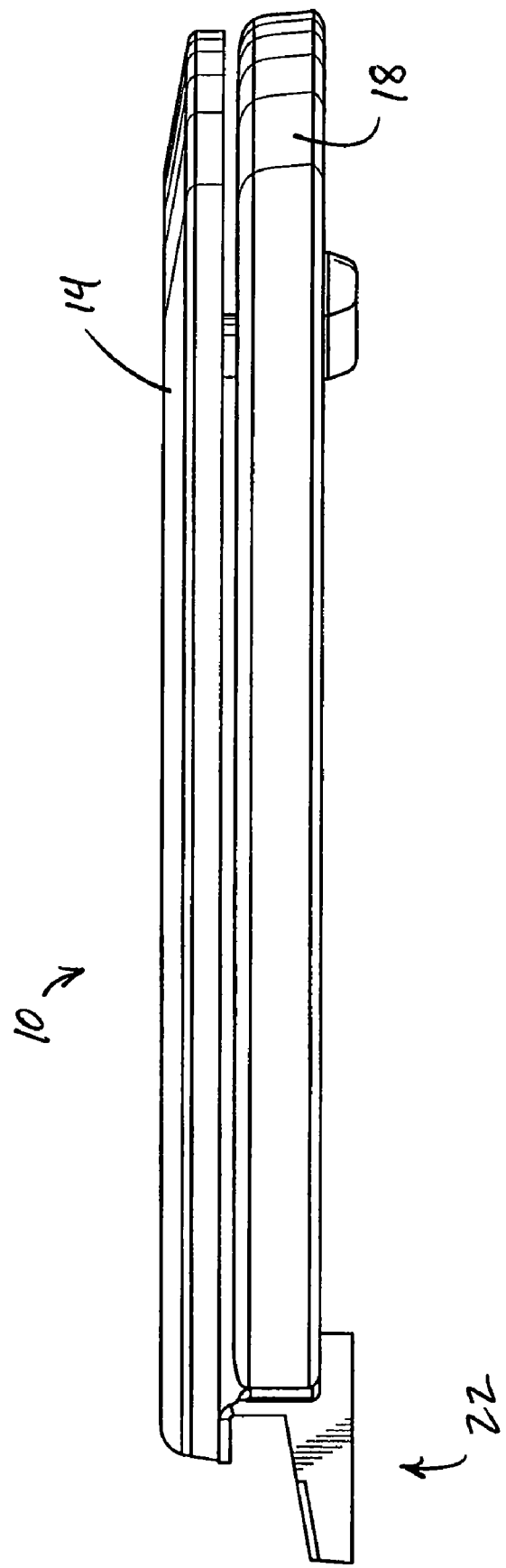
FIG. 2 is a side view of the seat.
Figure 3:
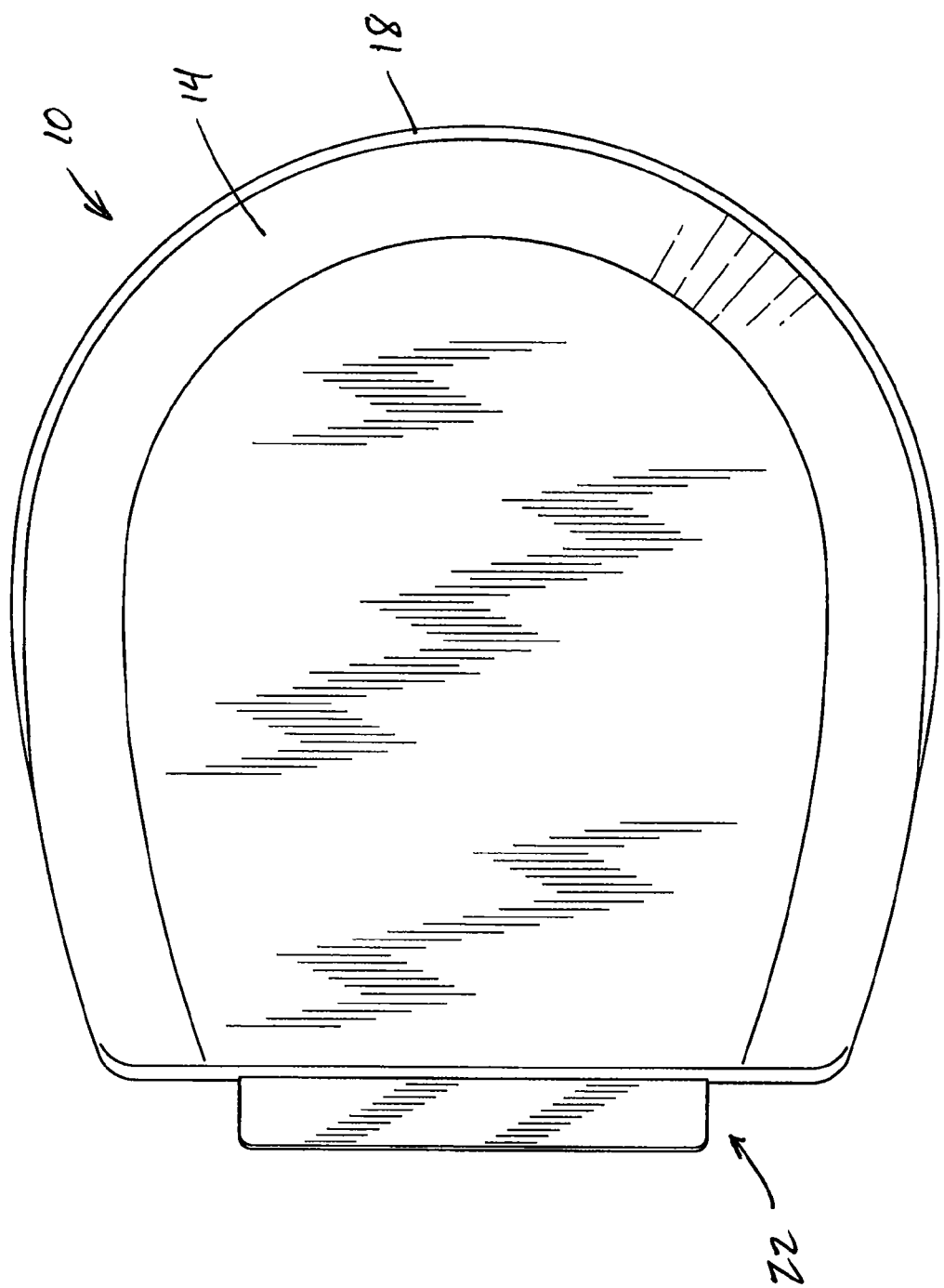
FIG. 3 is a top view of the seat.
Figure 4:
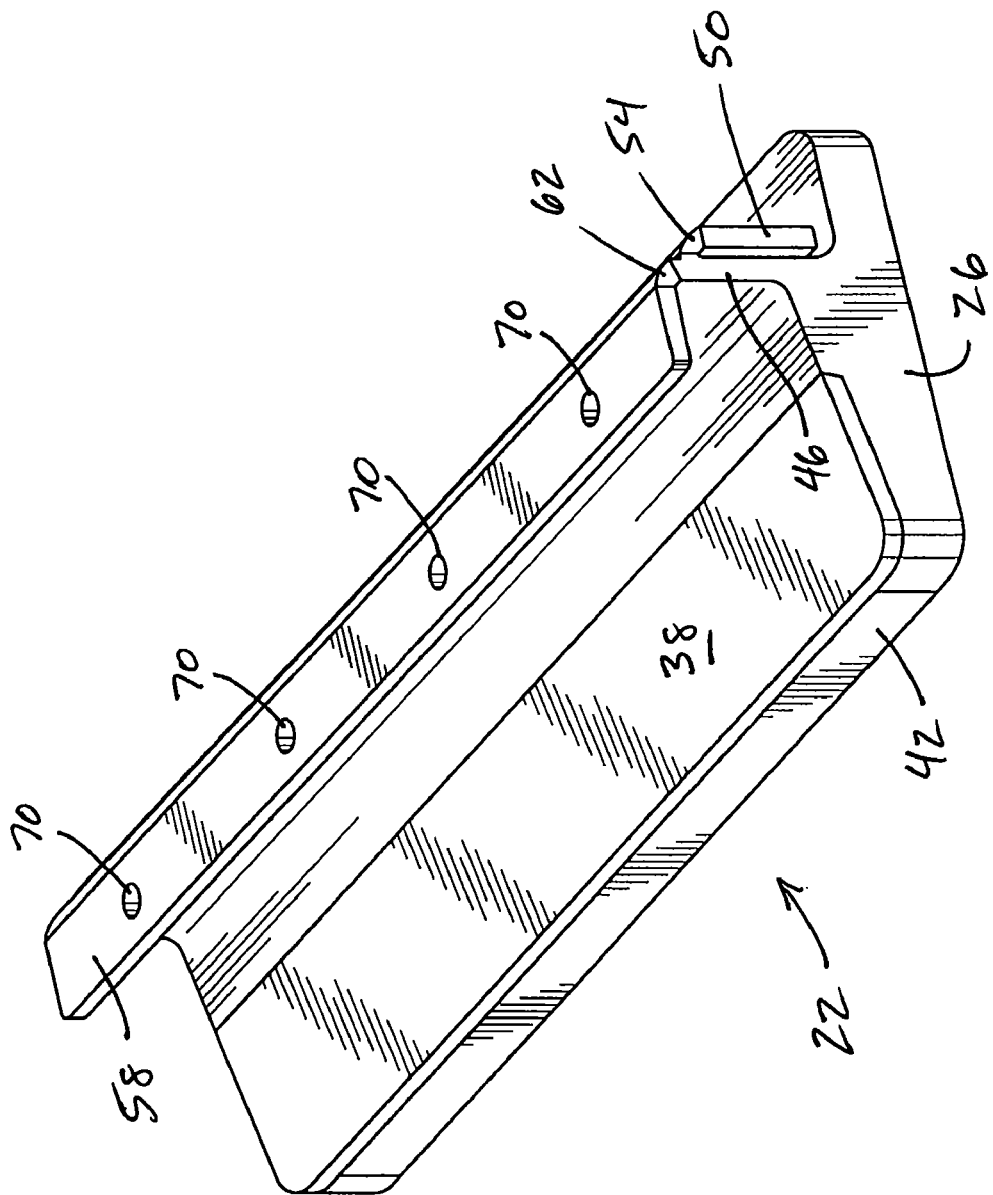
FIG. 4 is a perspective view of the hinge with its cap closed.
Figure 5:
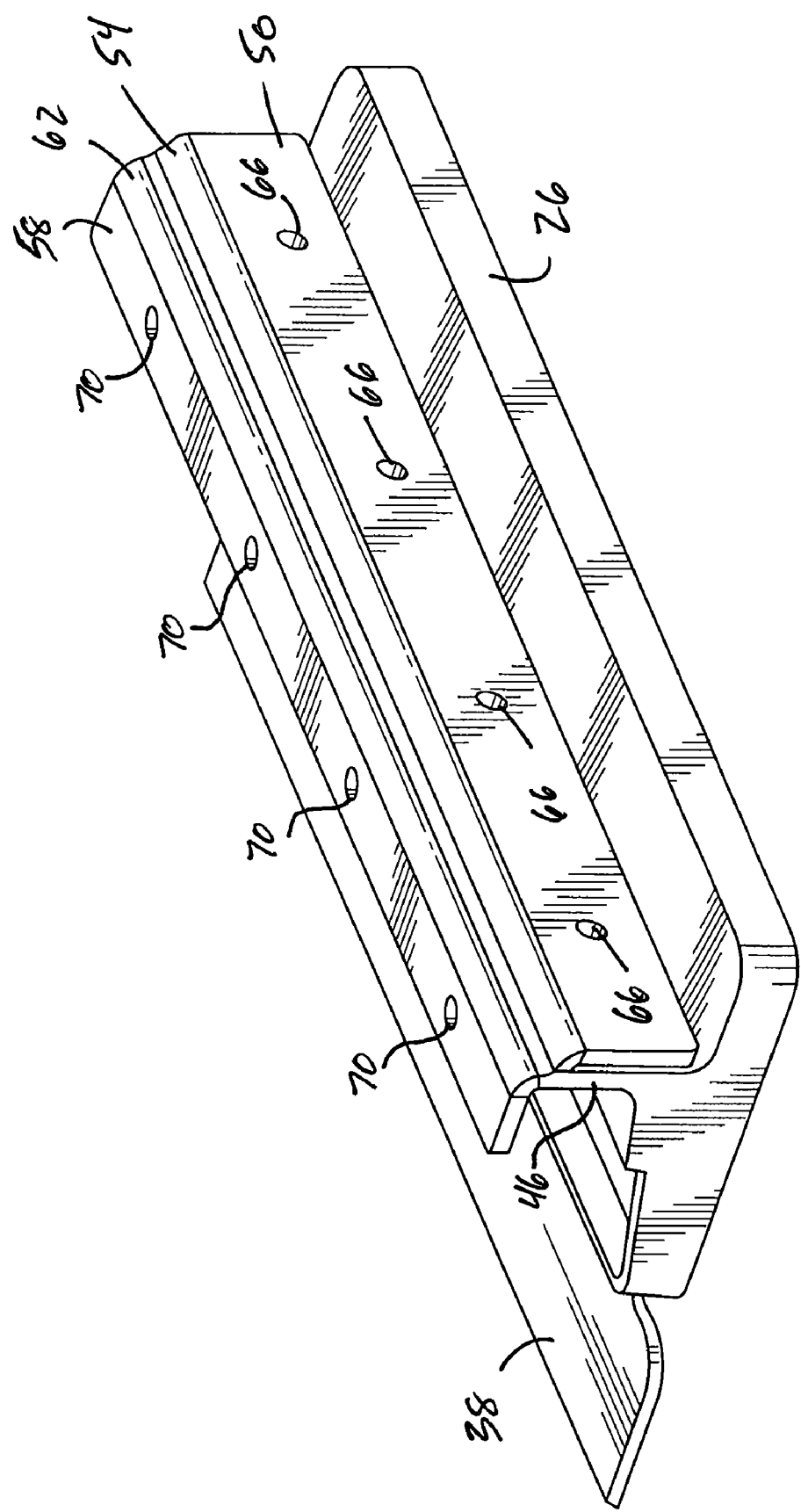
FIG. 5 is a perspective view of the hinge with its cap open.
Figure 6:
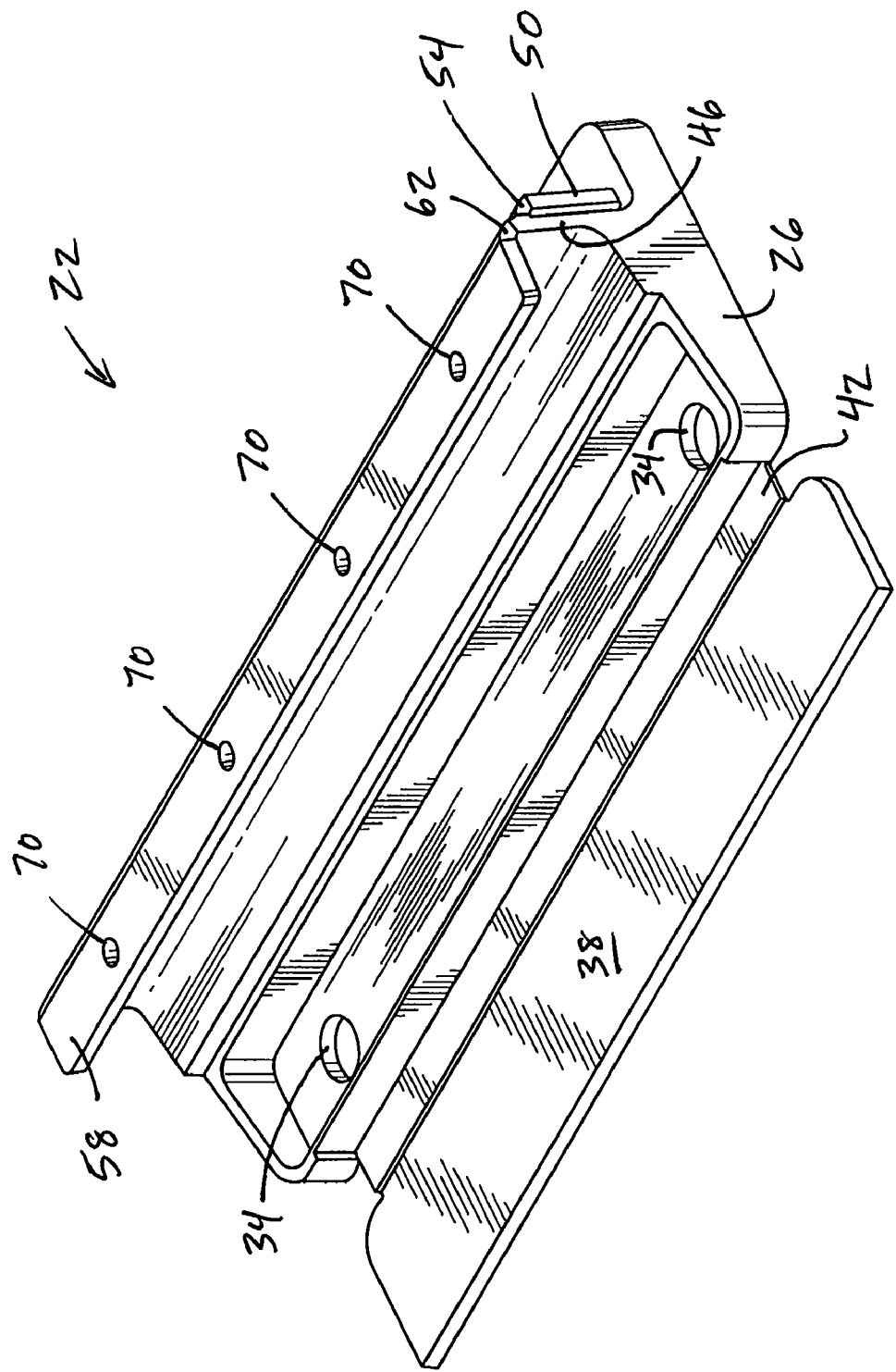
FIG. 6 is a rear perspective view of the hinge with its cap open.
Figure 7:
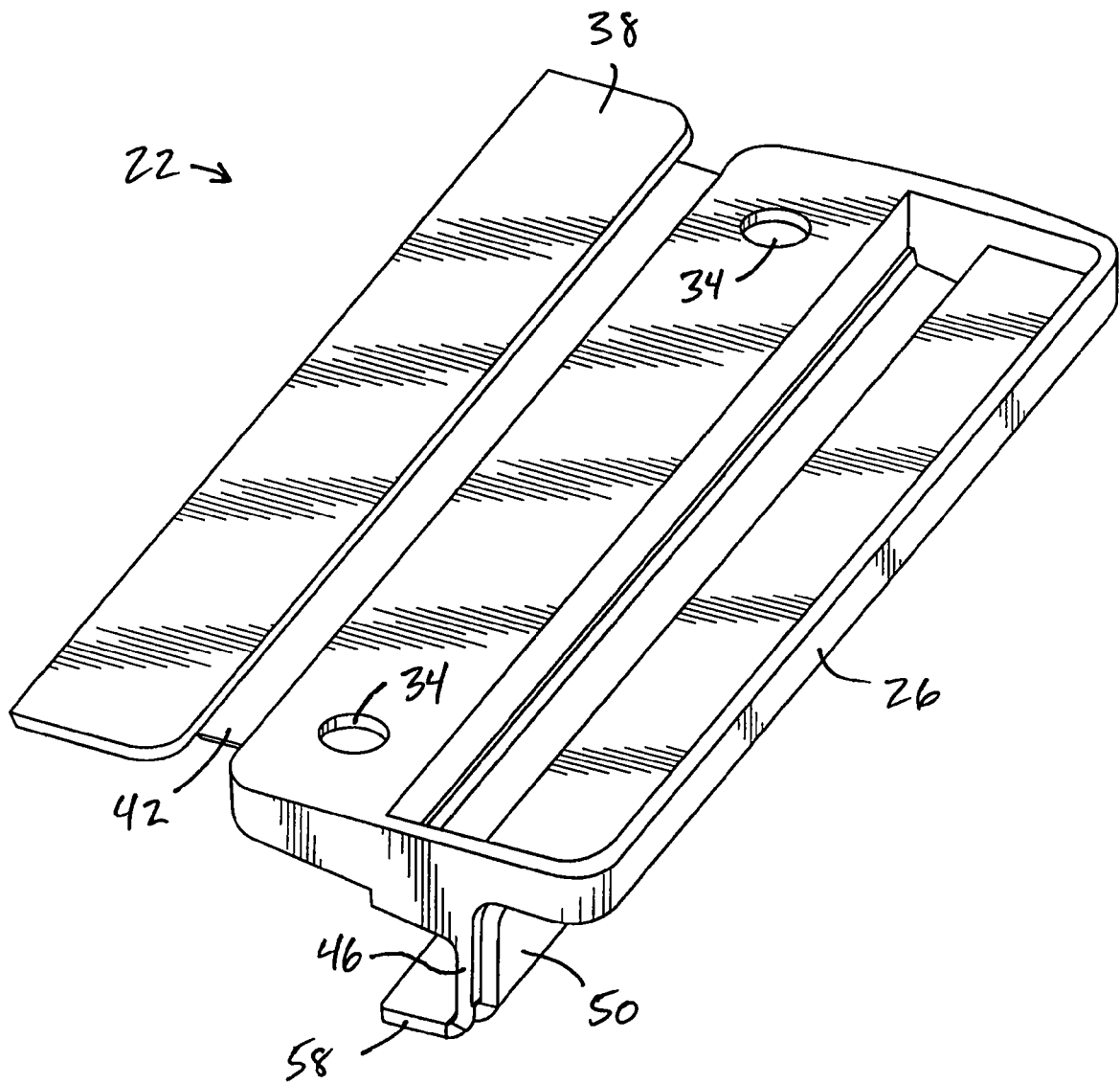
FIG. 7 is a bottom perspective view of the hinge with its cap open.
Figure 8:
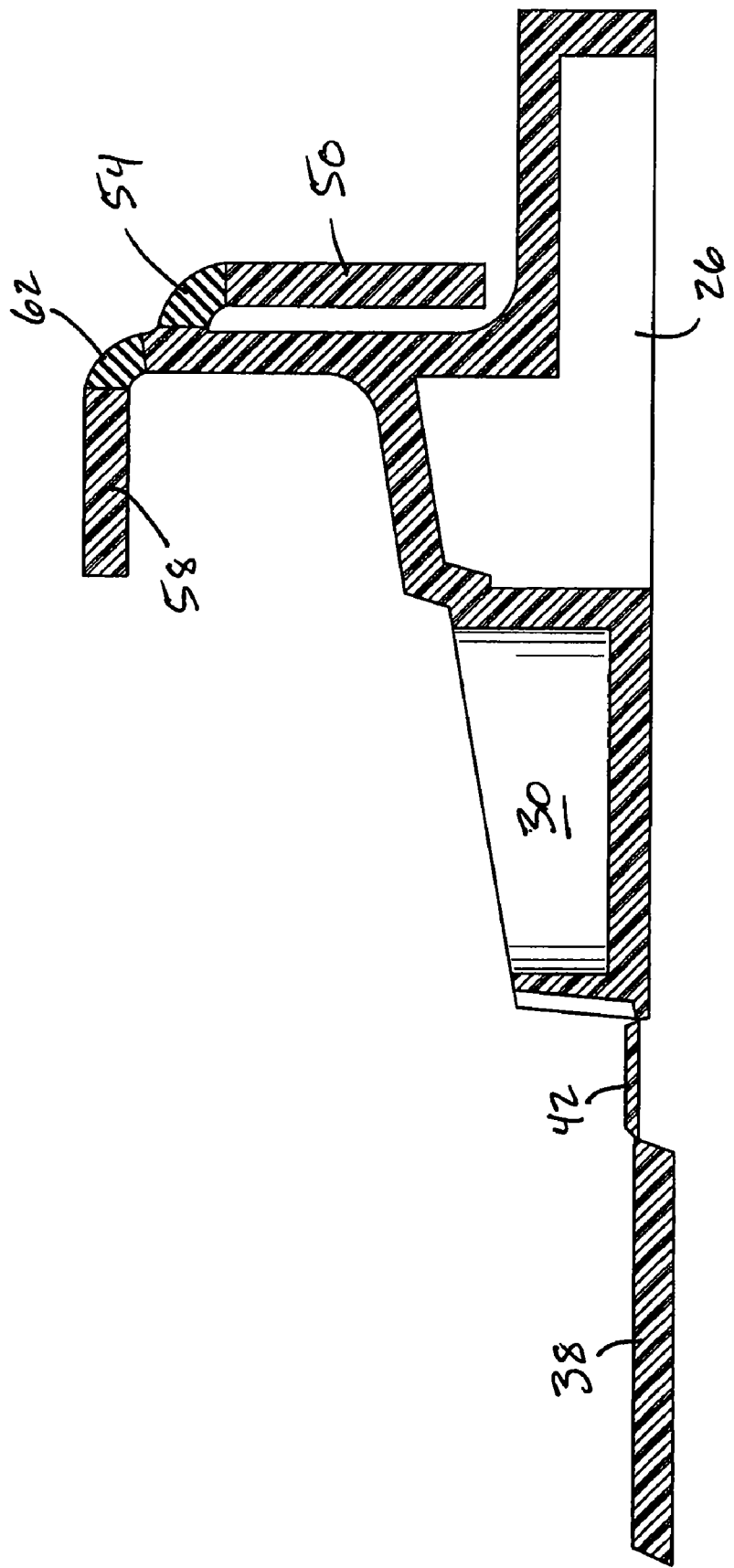
FIG. 8 is a cross-sectional view of the hinge with its cap open.
Figure 9:
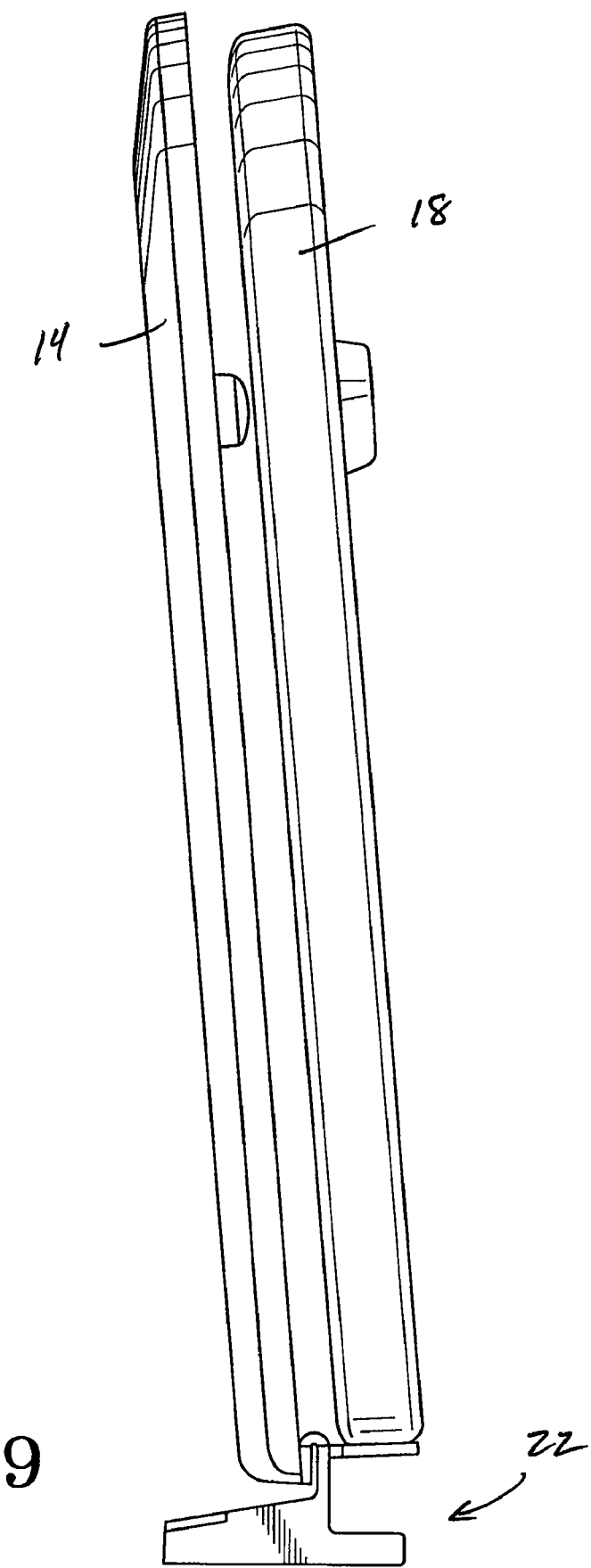
FIG. 9 is a side view of the seat with the ring and cover up or open.
Figure 10:
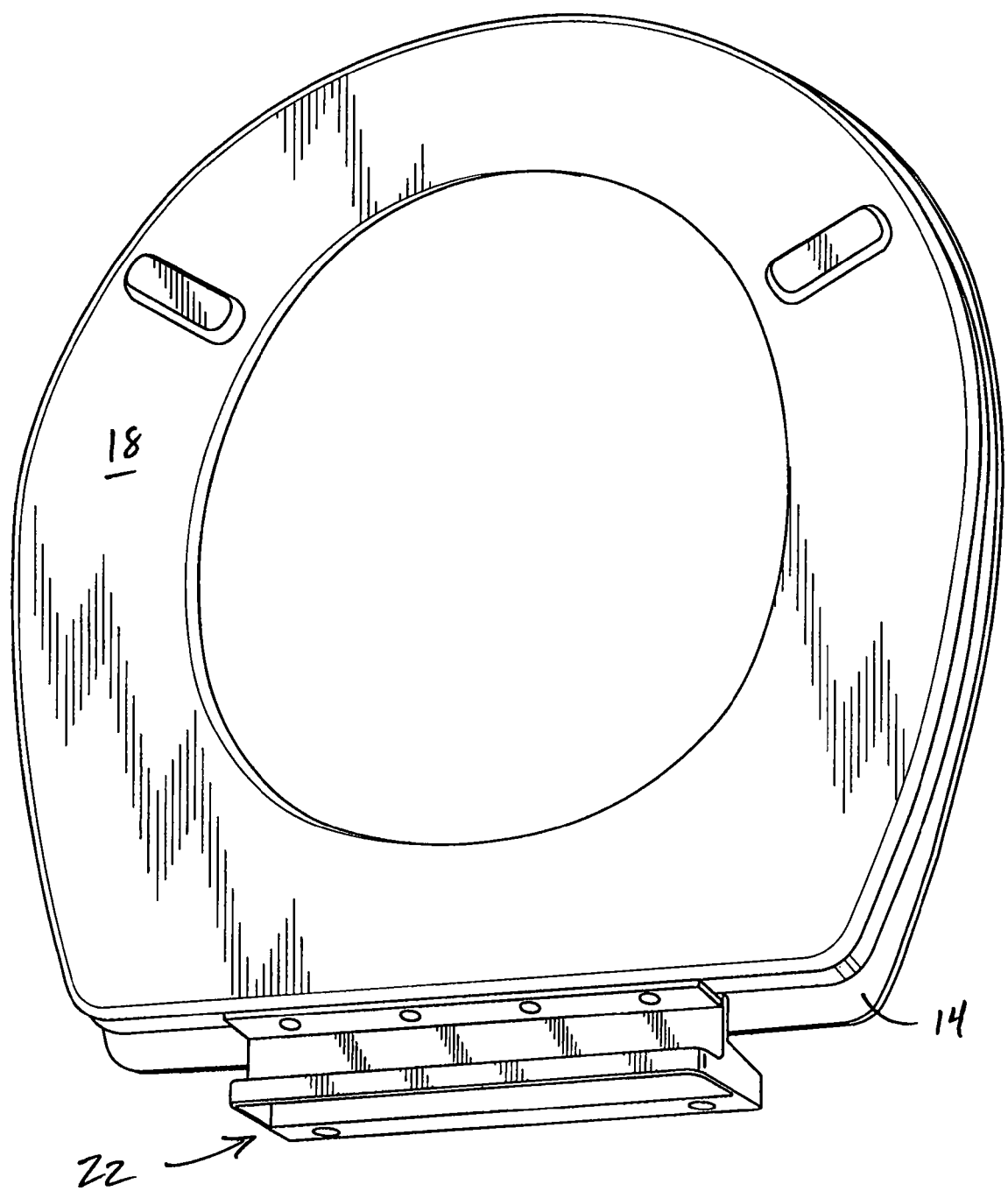
FIG. 10 is a perspective view of the seat with the ring and cover up or open.
Figure 11:
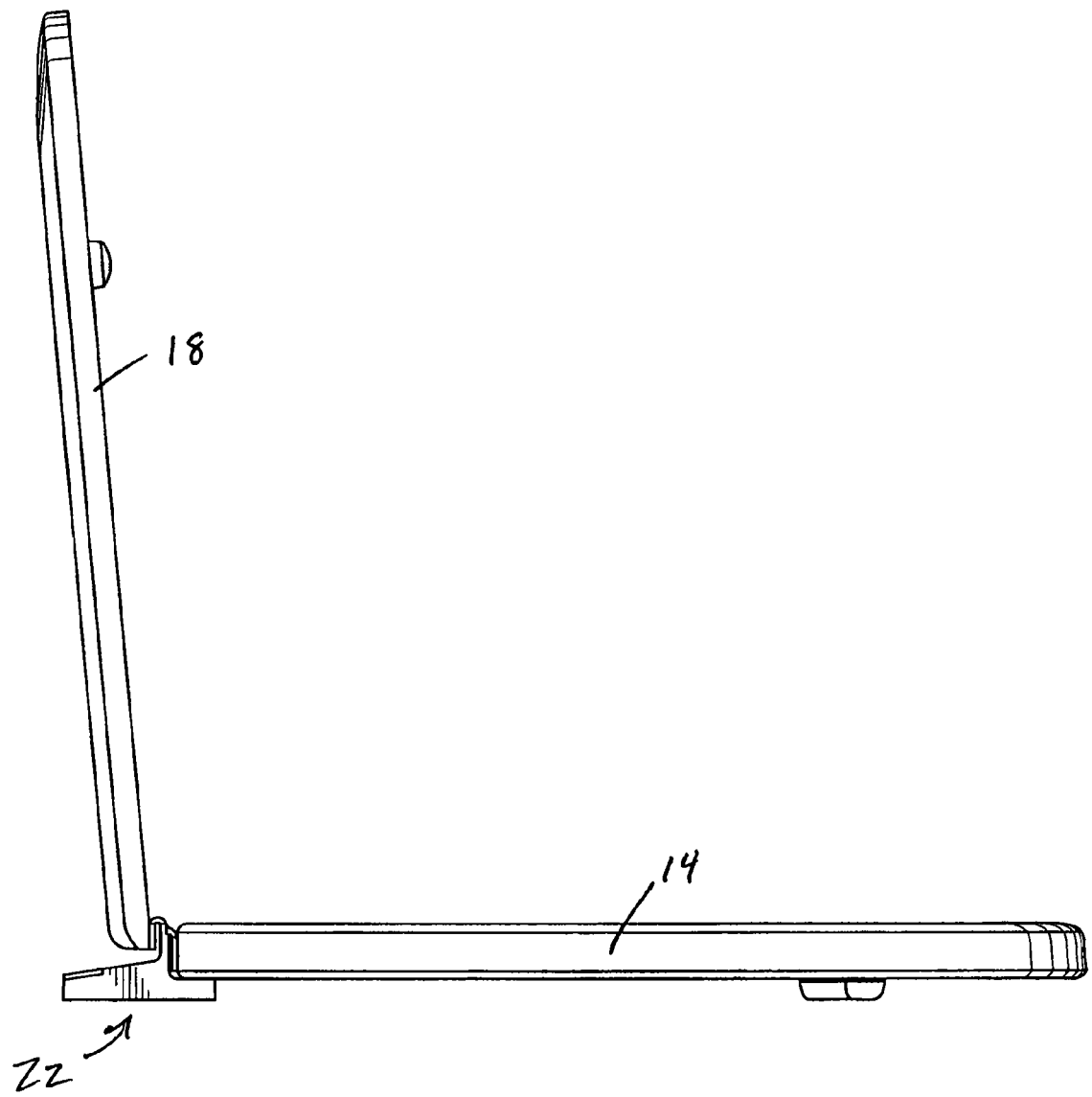
FIG. 11 is a side view of the seat with the cover up and the ring down.
Figure 12:
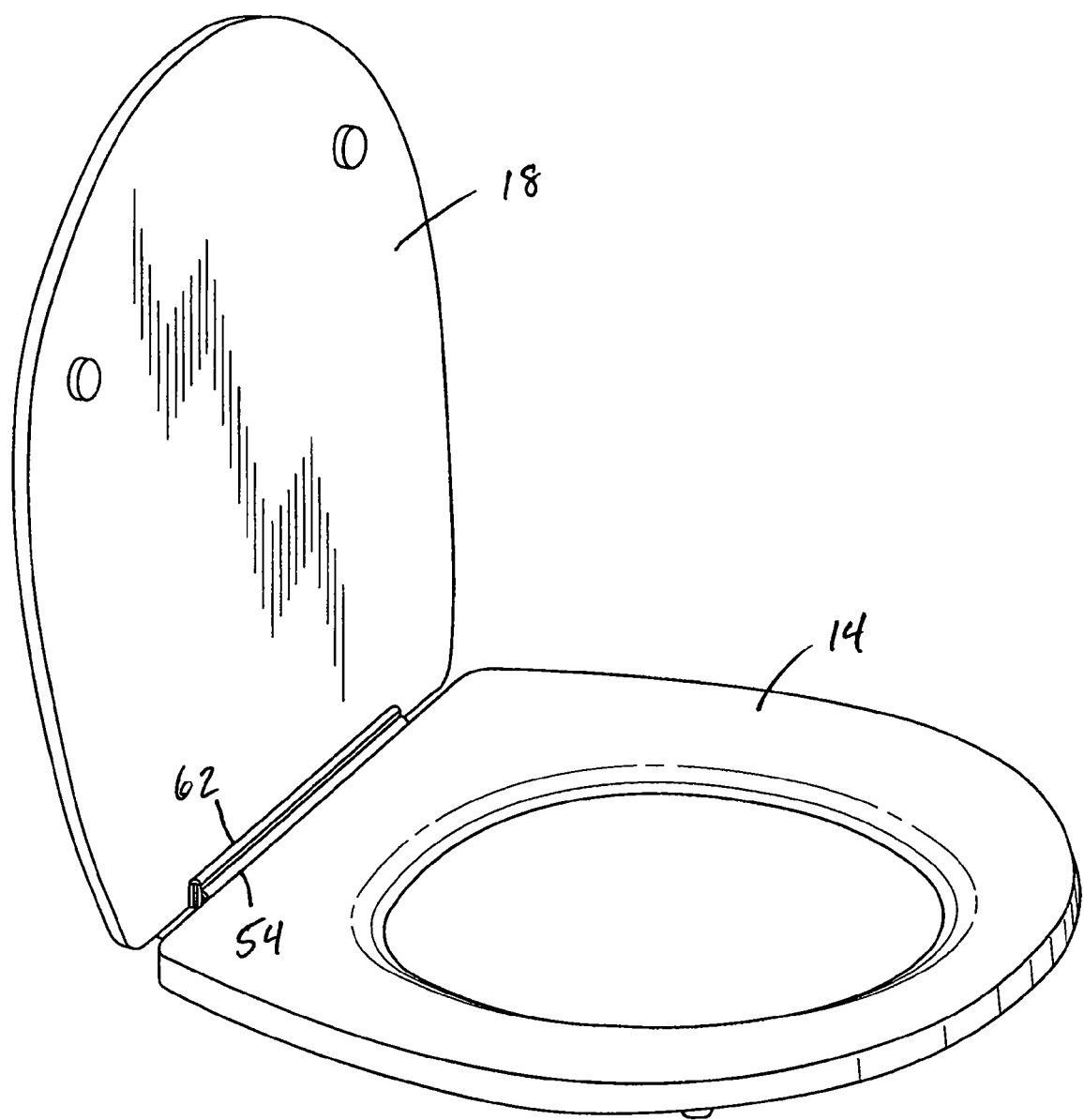
FIG. 12 is a perspective view of the seat with the cover up and the ring down.

FIGS. 1 through 3 show a toilet seat assembly 10 embodying the invention. The seat assembly 10 includes a toilet seat 12 including a cover 14 and a ring 18, as is known in the art. The assembly 10 also includes a hinge 22 for connecting the toilet seat 12 to a toilet bowl (not shown). The hinge 22 is pivotally connected to the cover 14 and to the ring 18. As shown in FIGS. 4 through 6, the hinge 22 includes a base 26 that sits on top of the toilet bowl, as is known in the art. The base 26 has therein a pocket 30 (FIG. 6) with screw or bolt holes 34 that align with holes in the flange of the toilet bowl. Bolts (not shown) extend through the holes 34 and through the holes in the flange, and nuts (not shown) are threaded onto the bolts to secure the hinge 22 to the toilet bowl. The heads of the bolts are located in the pocket 30. The hinge 22 also includes a cap 38 connected to the base 26 by a living hinge 42 for movement between open (FIGS. 5 and 6) and closed (FIG. 4) positions. The cap 38 covers the bolt heads and closes the pocket 30 when the cap 38 is in the closed position.

The hinge 22 also includes a support portion or hinge post 46 extending upward from the base 26. Preferably the base 26 and the hinge post 46 are a unitary structure. A ring hinge leaf 50 is connected to the hinge post 46 by a living hinge 54, and a cover hinge leaf 58 is connected to the hinge post 46 by a living hinge 62. The ring hinge leaf 50 has therein screw holes 66 (FIG. 5) and is connected to the ring 18 by screws (not shown) extending through the holes 66 and into the ring 18. The cover hinge leaf 58 has therein screw holes 70 and is connected to the cover 14 by screws (not shown) extending through the holes 70 and into the cover 14. The ring 18 and the cover 14 are both pivotable between raised or up and lowered or down positions, as shown in the drawings.

The base 26, the hinge post 46 and the hinge leaves 50 and 58 can be made of any suitable rigid material known in the art, especially a material suitable for injection molding, such as a rigid thermoplastic, preferably polyolefin, such as polypropylene or polyethylene. The living hinges 42, 54 and 62 are preferably made of a thermoplastic elastomer, but can be made of any suitable flexible material. The broad term thermoplastic elastomers, or TPE's, can be subdivided into subgroups such as thermoplastic polyolefins, TPO's, thermoplastic polyurethanes, TPU's, thermoplastic vulcanisates, TPV's, styrene block copolymers, SBC's, copolyesters, COPE's, and copolyamides, COPA's. Other flexible thermoplastics plastics such as flexible PVC and ethylene vinyl acetate, EVA, which are not true elastomers, might also work depending on the resin used in the non-flexible part of the hinge. If a polyolefin, polypropylene or polyethylene is used for the non-flexible part of the hinge, the TPO's and TPV's seem to offer the best bonding to the elastomeric portion of the hinge.

Dow Plastics provides the Engage family of TPO's. GLS provides a variety of TPO's, TPV's and TPU's with family names of Kraton, Dynaflex, Versaflex, Versalloy, and Versollan. Other trade names include Nexprene, Santoprene and Sarlink.

The manner in which the hinge 22 is injection molded is described below.

Figure 13:
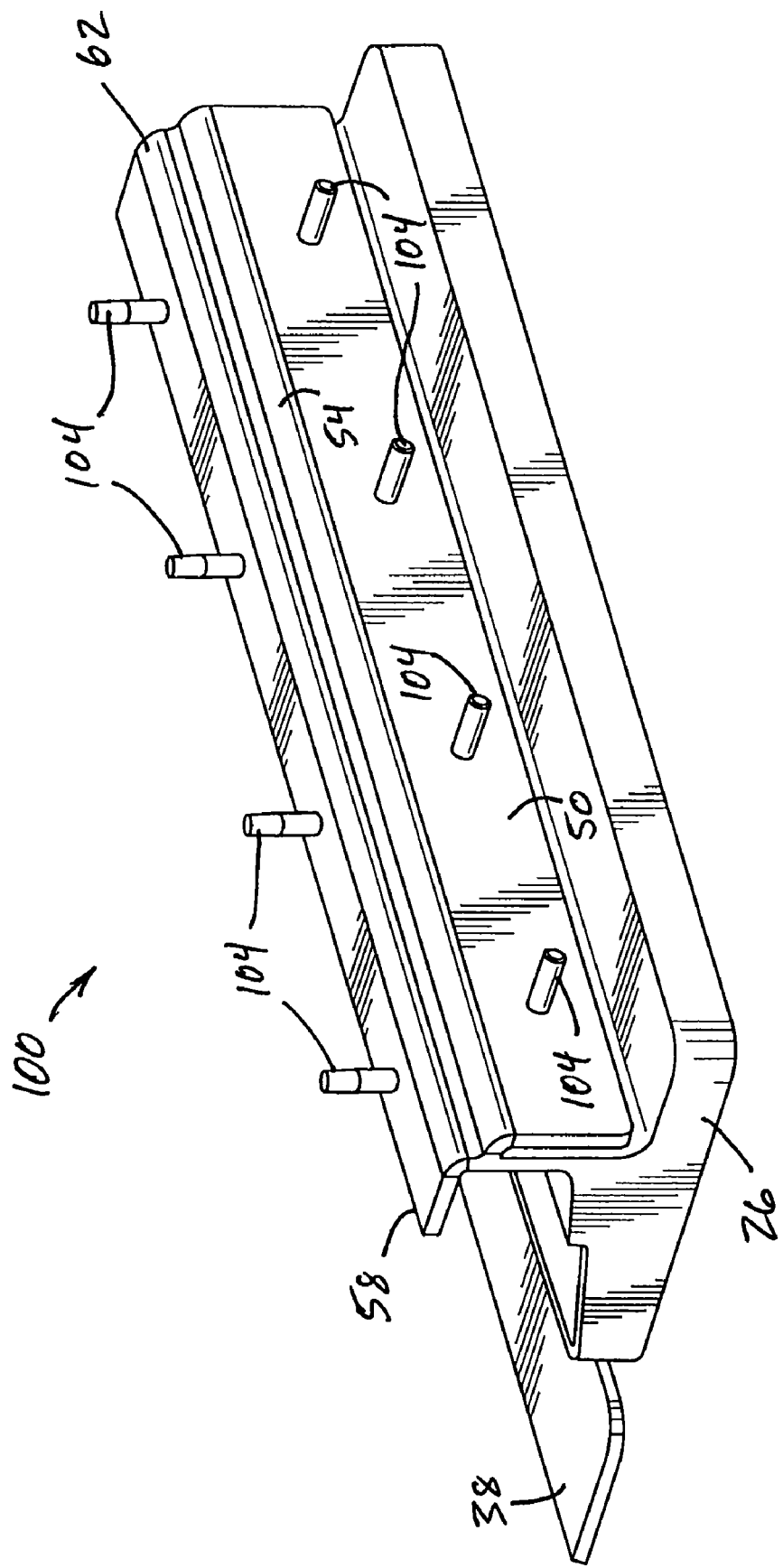
FIG. 13 is a perspective view of an alternative hinge with barbed leaves.

An alternative hinge 100 is shown in FIG. 13. Instead of screw holes, the hinge leaves 50 and 58 have thereon barbs or pins 104 for connection to the ring 18 and the cover 14. The pins 104 are inserted into holes (not shown) in the ring and the cover and glued to the ring or cover. This method of connection is known in the art.

Figure 14:
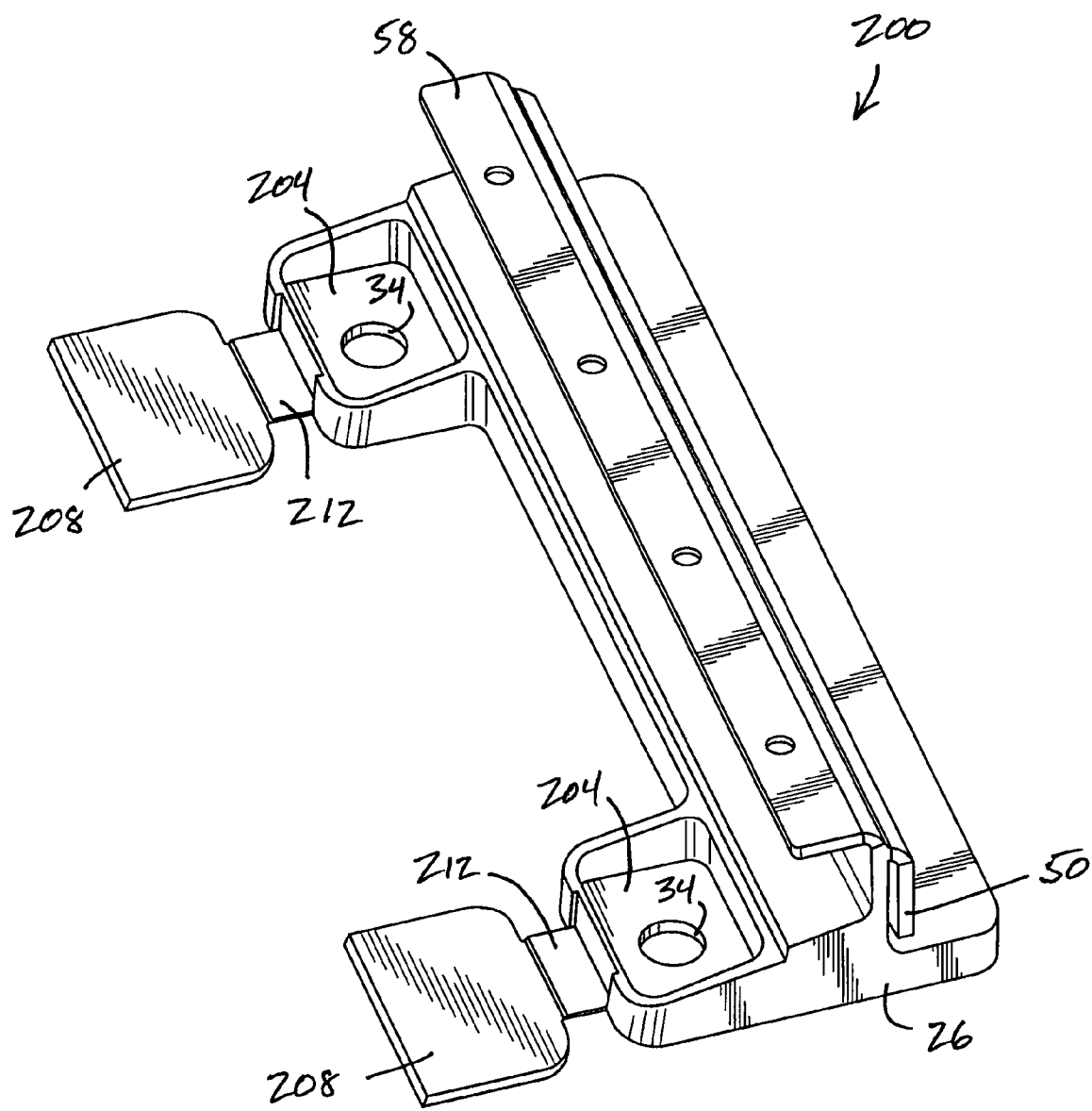
FIG. 14 is a perspective view of another alternative hinge with two separate caps.

FIG. 14 illustrates another alternative hinge 200. The hinge 200 has two separate pockets 204 for the bolt holes 34, and has two separate caps 208 for the pockets 204. Each cap 208 is connected to the base by a living hinge 212.

Figure 15:
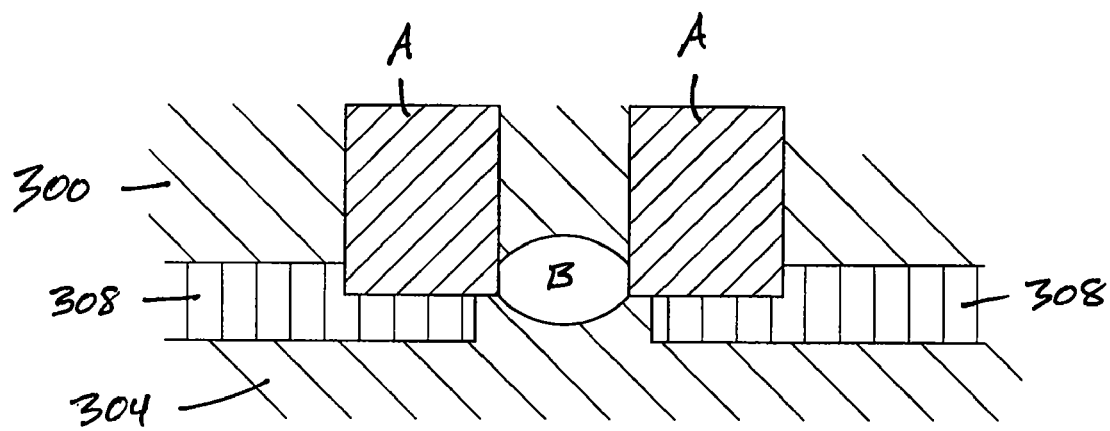
FIG. 15 is a partial sectional view of a mold for making the hinge, the mold having movable cores positioned for the first shot of material.
Figure 16:
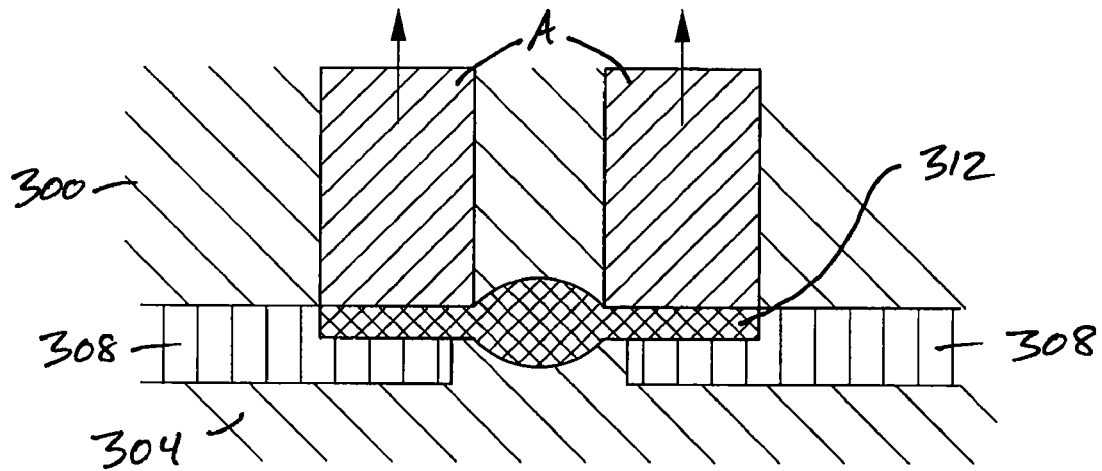
FIG. 16 is a view similar to FIG. 15 showing the cores retracted for the second shot of material.
Figure 17:
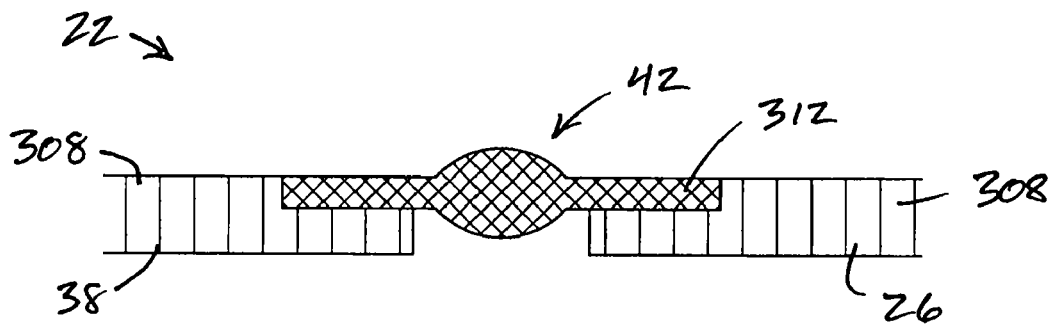
FIG. 17 shows a portion of the resultant hinge after the second shot.
Figure 18:
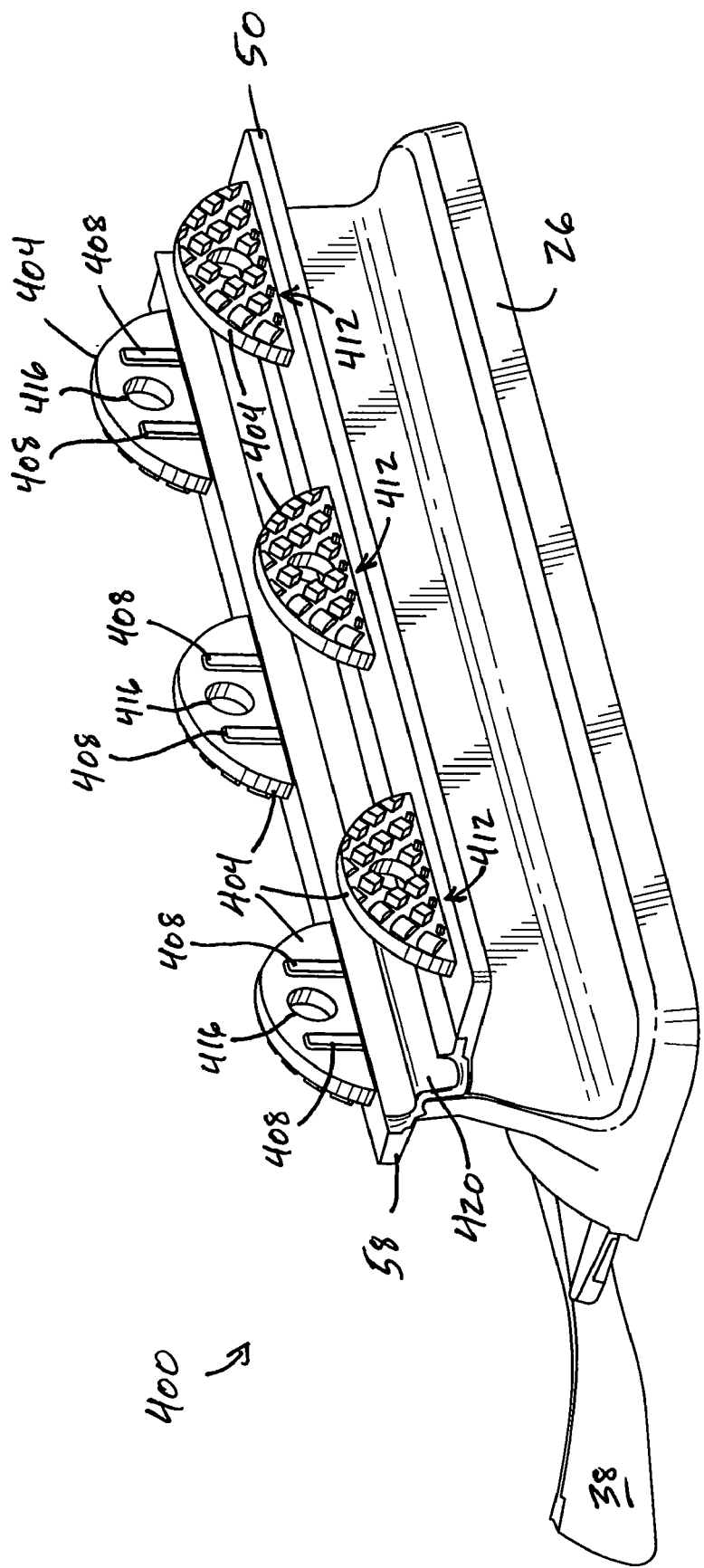
FIG. 18 is a front perspective view of another alternative hinge with its cap open.
Figure 19:
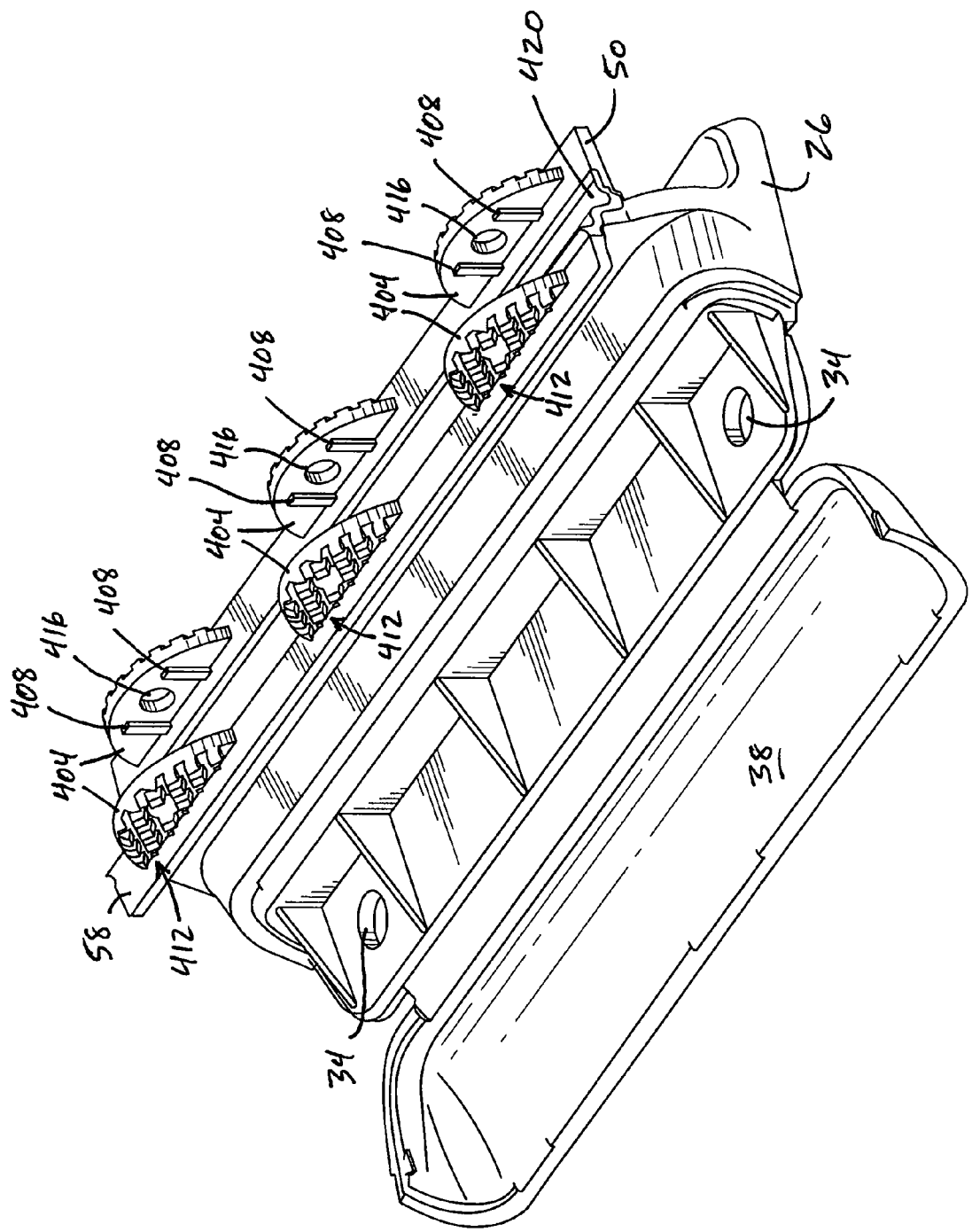
FIG. 19 is a rear perspective view of the hinge with its cap open.
Figure 20:
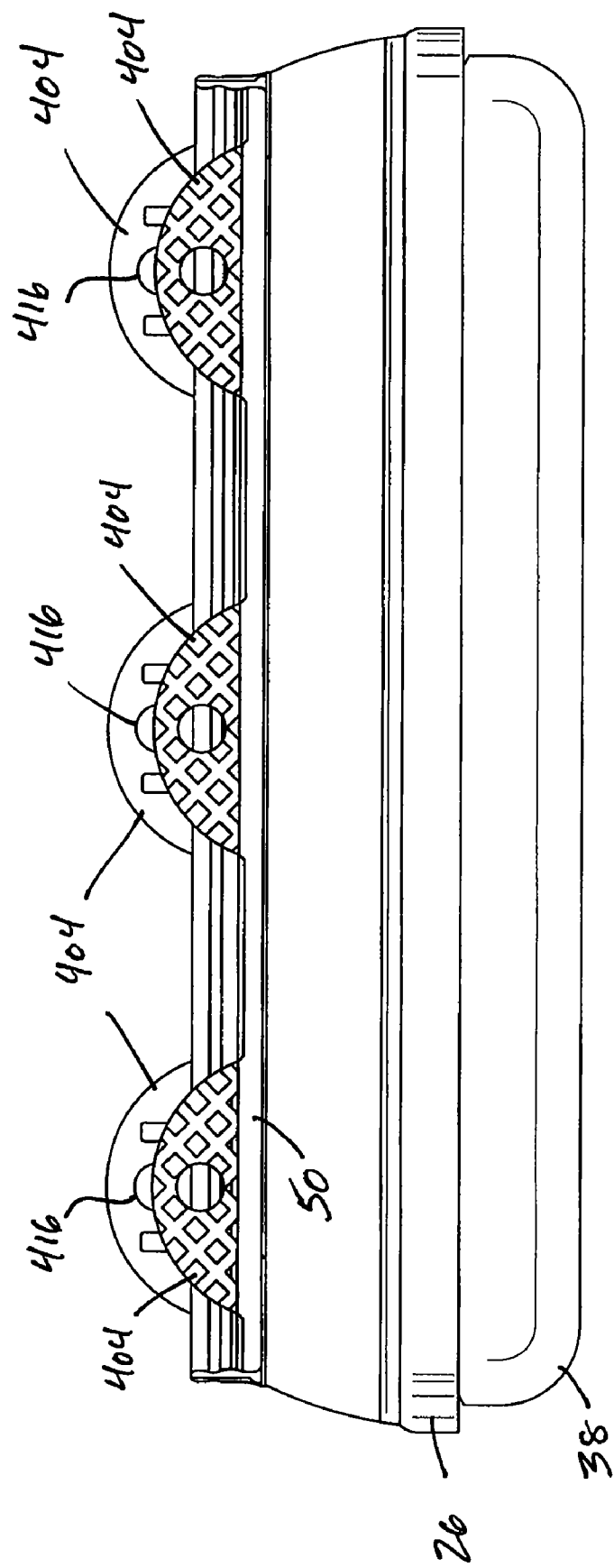
FIG. 20 is a front view of the hinge with its cap open.

The hinge 22 is preferably injection molded in a two-shot process illustrated in FIGS. 15 through 17. For the first shot, the mold cavity is defined by at least two mold pieces 300 and 304, and each living hinge is further defined by two retractable cores A (two are shown in FIG. 15.). During the first shot, the material 308 that will form the rigid base, hinge post and hinge leaves is injected into the mold. The cores A prevent this material from filling the space B where the living hinge will be. After the first shot, the cores A are retracted, upward as shown in FIG. 16, and the material 312 that will form the living hinges, including the hinge 42, is injected into the now-accessible space where the living hinge 42 will be. The resultant hinge 22 is partially shown in FIG. 17.

The injection molding machine used for this process preferably has two barrels, one for each type of material. The first barrel communicates with the mold space forming the rigid base, hinge post and hinge leaves, and the second barrel communicates with the mold space forming the living hinges, including the space B mentioned above.

It should be understood that this type of injection molding process can be used to make multimaterial objects other than toilet seat hinges. Also, additional barrels could be used to inject additional materials.

It should also be understood that other injection molding methods, such as those described above, can be used.

FIGS. 18 through 24 illustrate another alternative hinge 400. The hinge 400 has many elements in common with the hinge 22, and common elements have been given the same reference numerals. The hinge 400 is preferably made by a process similar to that illustrated in FIGS. 15 through 17.

Figure 24:
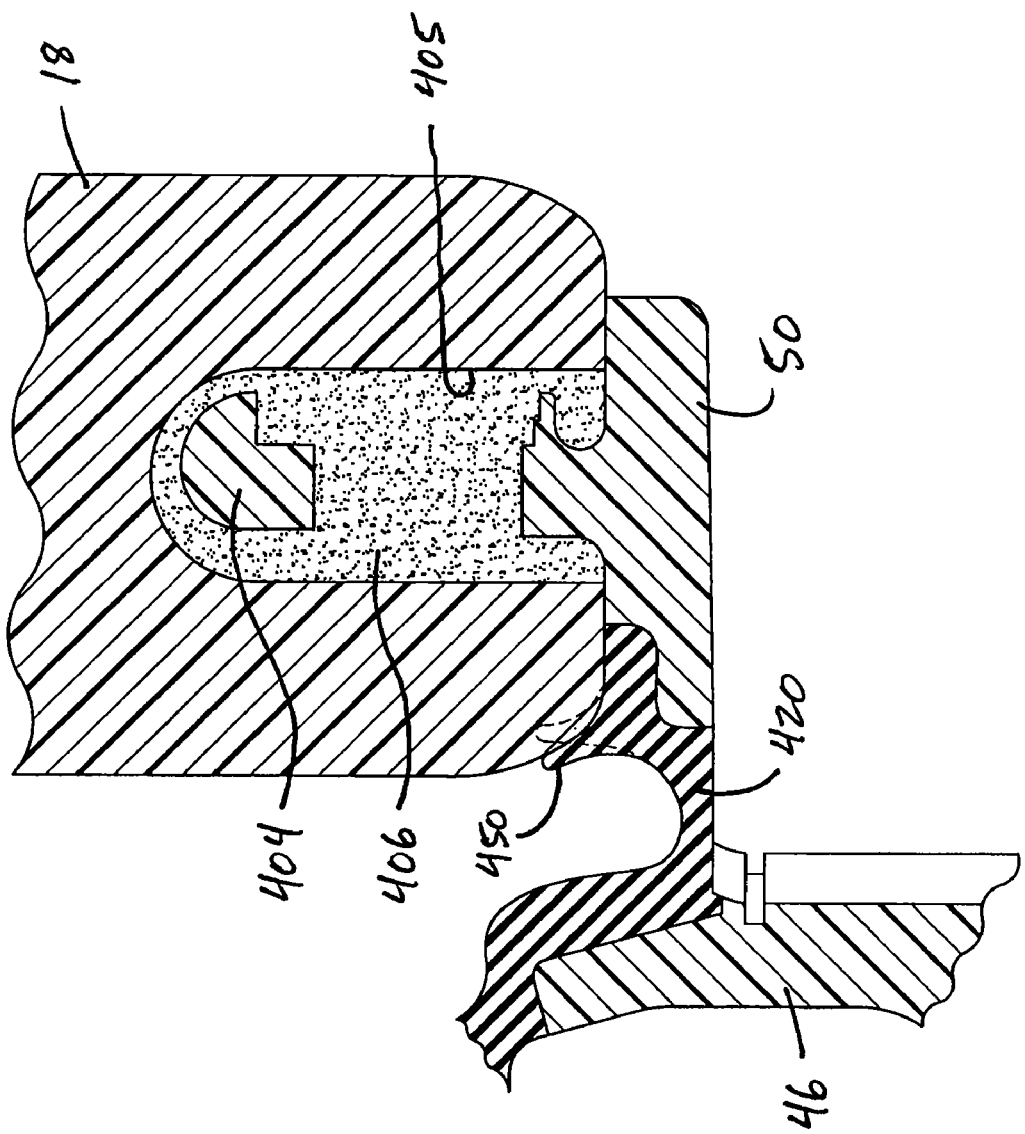
FIG. 24 is a partial sectional view of the hinge showing the connection of the cover leaf to the cover.

Instead of screw holes for connection to the ring 18 and to the cover 14, the hinge leaves 50 and 58 each have thereon arcuate or semi-circular tongues 404 that extend into complementary recesses 405 in the ring and in the cover. The connection of the cover leaf 58 to the cover 14 is shown in FIG. 24. Glue 406 secures the leaf 50 to the ring and secures the leaf 58 to the cover. One side of each tongue 404 has thereon (see FIGS. 18 and 19) parallel ribs 408 and the opposite of each tongue 404 has thereon a pattern of bumps or projections 412. Each tongue 404 has therethrough an aperture 416. The ribs 408 and the projections 412 engage the walls of the associated recess 405 to provide a tight fit between the tongue 404 and the attached ring or cover, while also leaving space for glue. The projections 412 and the aperture 416 create spaces into which the glue can flow to provide a mechanical connection or interlock between the tongue 404 and the ring or cover when the glue hardens. It is preferred to have this mechanical interlock because glue may not adhere reliably to the plastic material of the tongue 404.

Figure 21:
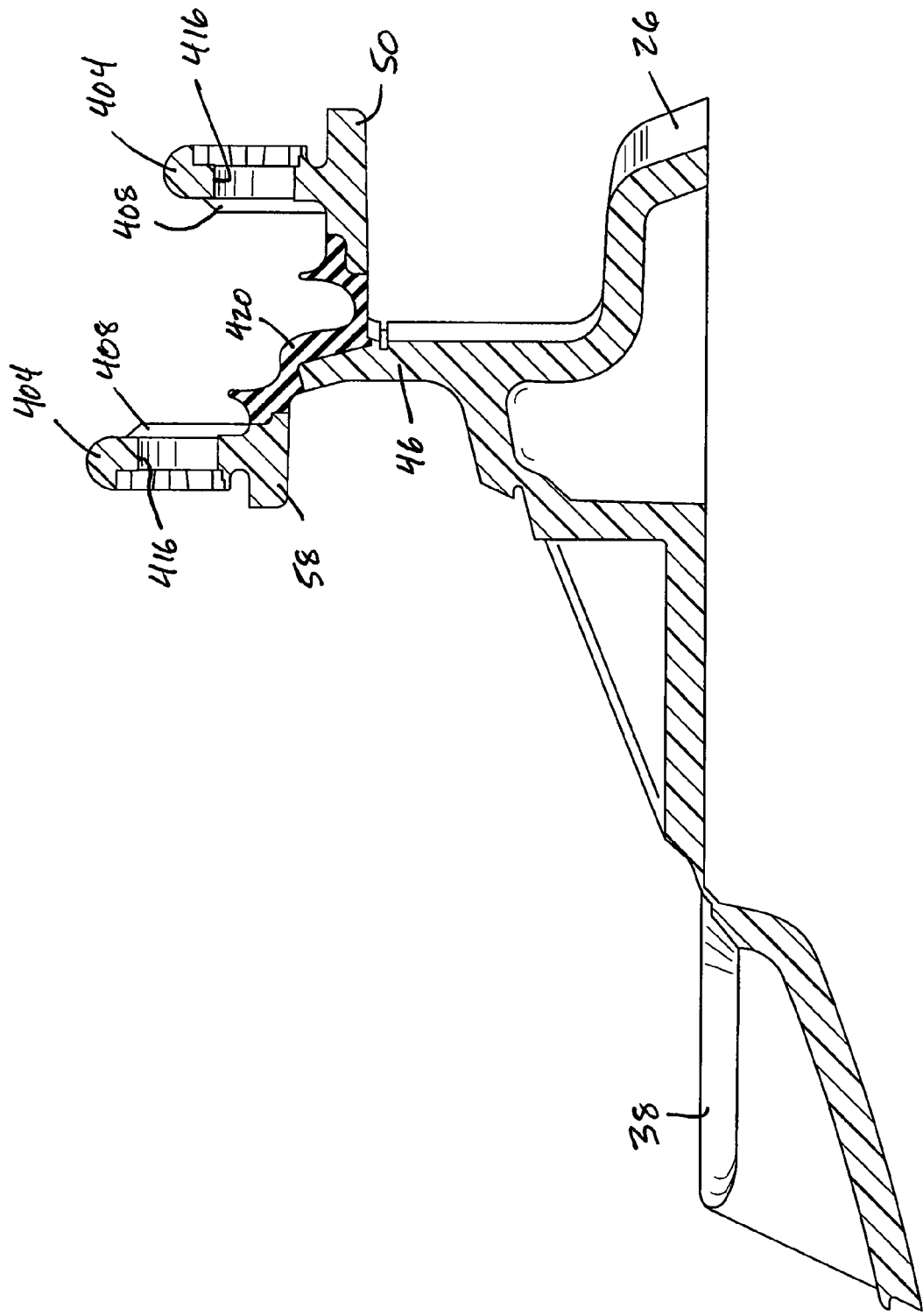
FIG. 21 is a sectional view taken along line 21-21 in FIG. 20.
Figure 22:
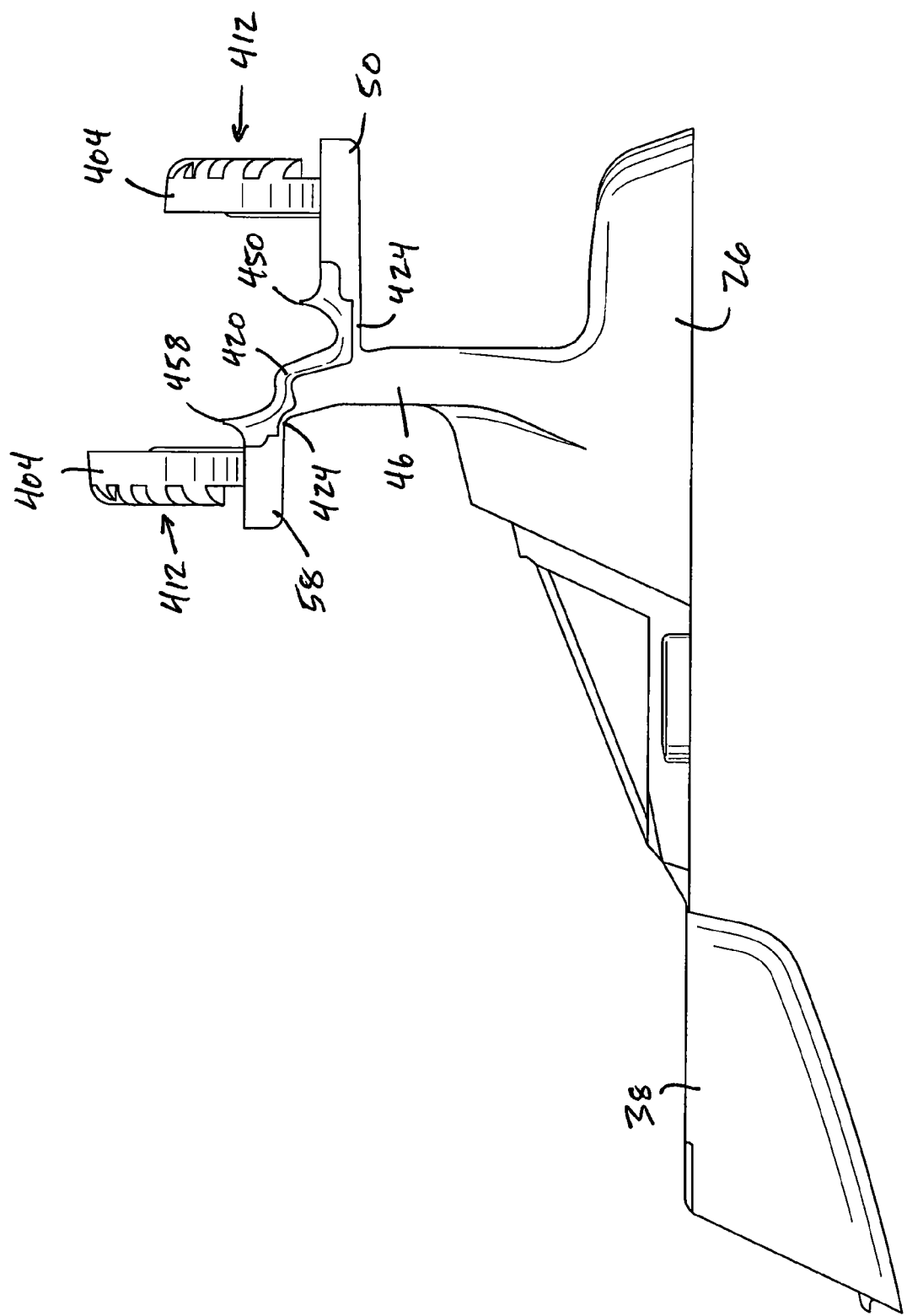
FIG. 22 is a side view of the hinge with its cap open.
Figure 23:
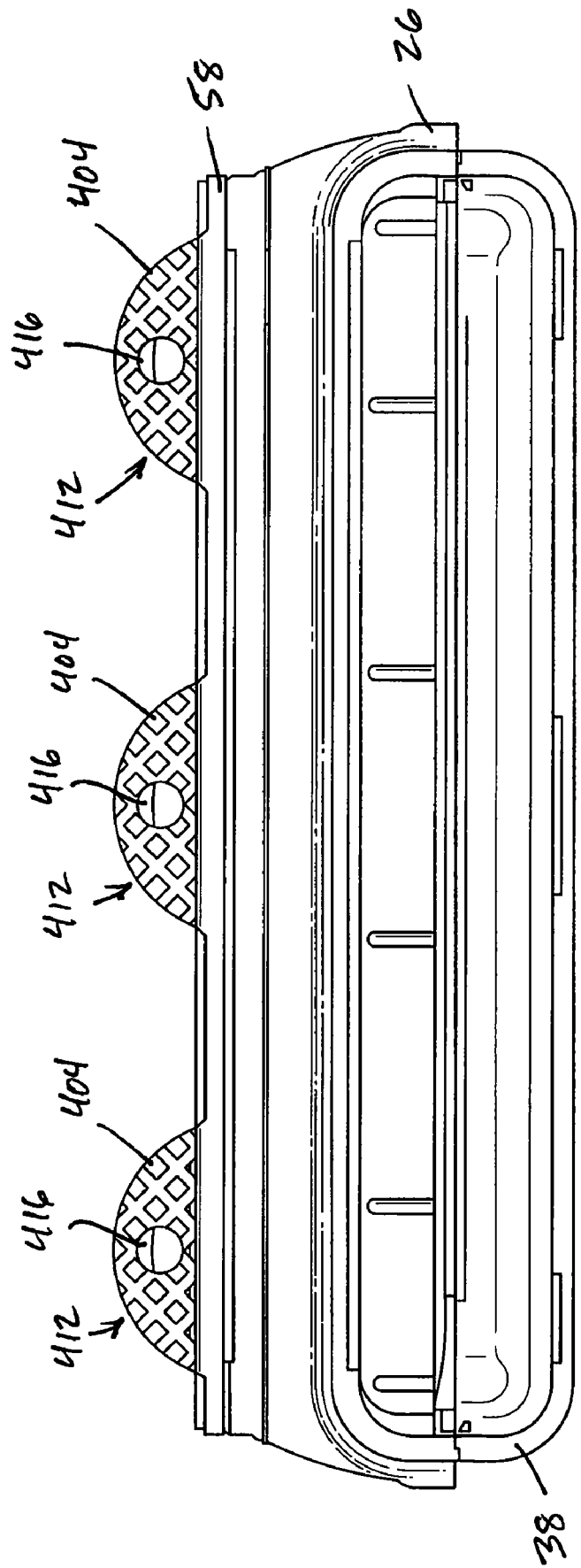
FIG. 23 is a rear view of the hinge with its cap open.

Instead of the separate living hinges 54 and 62, the hinge 400 has a single living hinge 420 that connects both leaves 50 and 58 to the hinge post 46. The living hinge 420 can be made of any of the materials described above. As seen in FIGS. 21 and 22, the living hinge 420 extends over the top of the hinge post 46 and connects to both of the leaves 50 and 58. The interface between the living hinge 420 and each leaf is non-planar (not on a single plane). More particularly, the interface has a stepped or lapjoint design. This connection of the flexible material to the rigid material increases the bonding area between the two materials and therefore reduces the stress on the interface, making a stronger connection. The radii of the steps help the plastic material to flow during injection and reduce the stress concentration that a sharp corner creates.

Along most of its length, the living hinge 420 completely separates the hinge post form the leaves, as seen in FIG. 21. However, adjacent the opposite ends of the living hinge 420, layers or webs 424 of the rigid material forming the hinge post 46 and the leaves 50 and 58 extend beneath the living hinge 420 and connect the hinge post 46 to the leaves 50 and 58. The webs 424 are best seen in FIG. 22. The webs 424 of rigid material serve several purposes. The spaces that ultimately form the webs 424 serve as the flow path for plastic to fill the leaf cavities (forming the leaves 50 and 58) with the rigid material in the first shot of the injection molding process. The webs 424 also serve to maintain the geometrical position of the leaves 50 and 58 relative to the hinge post 46 prior to the mold closing for the second shot of flexible material. The webs 424 also add some strength to the connection of the leaves 50 and 58 to the hinge post 46 in the finished hinge.

The living hinge 420 includes an axially-extending rib 450 adjacent the leaf 50 and an axially-extending rib 458 adjacent the leaf 58. By "axially-extending" it is meant that the ribs 450 and 458 extend between the opposite ends of the living hinge 420. The ribs 450 and 458 are molded in the second shot and are thus made of the flexible material. The ribs 450 and 458 function as flexible lip seals that conform to the surface of the attached ring or cover to prevent any gaps once the hinge 400 is assembled to the ring and cover. The manner in which the rib 450 engages the ring 18 is shown in FIG. 24.

Figure 25:
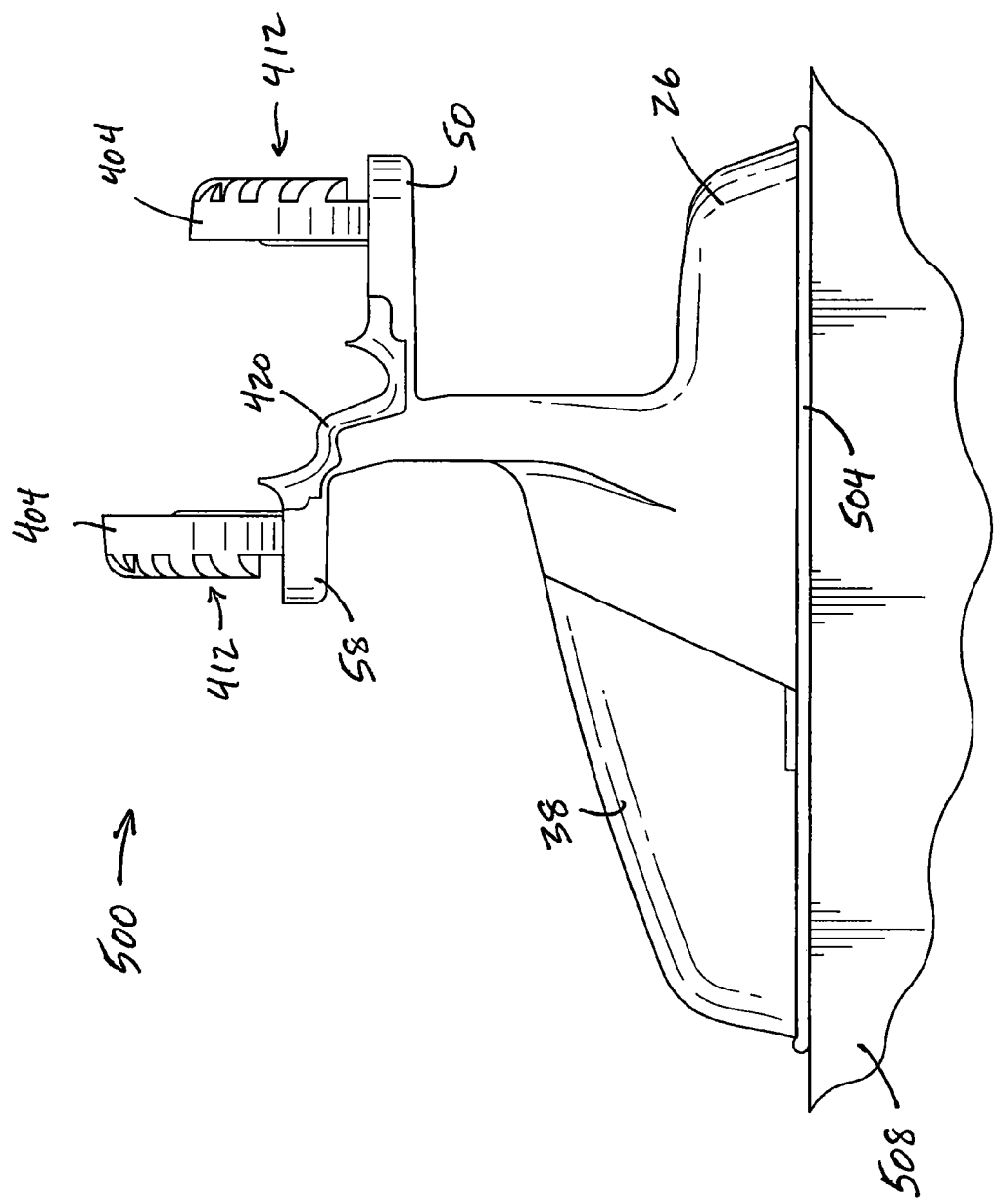
FIG. 25 is a side view of another alternative hinge.

FIG. 25 illustrates another alternative hinge 500. The hinge 500 has many elements in common with the hinge 400, and common elements have been given the same reference numerals. The only difference between the hinge 400 and the hinge 500 is that the base 26 of the hinge 500 has on its lower surface a compressible or flexible material 504, such as a thermoplastic elastomer. The layer of compressible material underneath the hinge keeps the nuts and bolts tighter longer and provides a tackier surface against the china of the toilet bowl 508, reducing surface slip. Thus, the material should have a high coefficient of friction with respect to china. The compressible material 504 preferably extends slightly out from beneath the base 26 around the entire periphery thereof to form a lip seal, which helps keep unwanted substances from getting beneath the base 26.

The invention claimed is:

1. A toilet seat hinge comprising:
   a base portion connectable to a toilet bowl, the base portion being made of a relatively rigid material;
   a leaf portion connectable to a toilet seat, the leaf portion being made of a relatively rigid material; and
   a living hinge portion pivotally connecting the base portion to the leaf portion, the living hinge portion being made of a material that is different from the material of the base portion and the material of the leaf portion and that is relatively flexible compared to the material of the base portion and the material of the leaf portion;
   wherein the toilet seat includes a ring and a cover, and wherein the leaf portion includes a ring leaf connectable to the ring, and a cover leaf connectable to the cover, and wherein the living hinge portion pivotally connects the ring leaf to the base portion and pivotally connects the cover leaf to the base portion;
   wherein the living hinge portion has thereon a first axially-extending rib adjacent the ring leaf and a second axially-extending rib adjacent the cover leaf, the first and second ribs functioning as flexible lip seals that conform to the surface of the attached ring or cover to prevent any gaps once the hinge is assembled to the ring and the cover.

2. The hinge of claim 1 wherein the base portion, the leaf portion and the living hinge portion are injection molded together.

3. The hinge of claim 2 wherein the living hinge portion is made of a thermoplastic elastomer.

4. The hinge of claim 3 wherein the base portion and the leaf portion are made of a rigid thermoplastic.

5. The hinge of claim 1 wherein the living hinge portion is formed by a single mass of material connected to both the ring leaf and the cover leaf.

6. A toilet seat hinge comprising:
a base portion connectable to a toilet bowl, the base portion being made of a relatively rigid material;
a leaf portion connectable to a toilet seat, the leaf portion being made of a relatively rigid material; and
a living hinge portion pivotally connecting the base portion to the leaf portion, the living hinge portion being made of a material that is different from the material of the base portion and the material of the leaf portion and that is relatively flexible compared to the material of the base portion and the material of the leaf portion;
wherein the toilet seat includes a ring and a cover, and wherein the leaf portion includes a ring leaf connectable to the ring, and a cover leaf connectable to the cover, and wherein the living hinge portion pivotally connects the ring leaf to the base portion and pivotally connects the cover leaf to the base portion;
wherein the ring leaf and the cover leaf each have opposite ends and an axial length extending between the ends, wherein the living hinge portion separates the ring leaf from the base portion over a substantial part of the length of the ring leaf, and wherein the living hinge portion separates the cover leaf from the base portion over a substantial part of the length of the cover leaf;
wherein the hinge further includes webs of relatively rigid material connecting the ring leaf to the base portion adjacent the ends of the ring leaf, and webs of relatively rigid material connecting the cover leaf to the base portion adjacent the ends of the cover leaf.

7. The hinge of claim 6 wherein the base portion, the ring leaf, the cover leaf and the webs are made of a single mass of relatively rigid material.

8. The hinge of claim 7 wherein the living hinge portion, the base portion, the ring leaf, the cover leaf and the webs are injection molded together.

9. The hinge of claim 8 and further comprising a stepped interface between the living hinge portion and each of the ring leaf and the cover leaf.

10. The hinge of claim 8 wherein the living hinge portion is made of a thermoplastic elastomer, and wherein the base portion and the leaf portion are made of a rigid thermoplastic.

11. The hinge of claim 1 wherein the base portion has a lower surface having thereon a flexible or compressible material engageable with the toilet bowl.

12. The hinge of claim 6 wherein the living hinge portion is formed by a single mass of material connected to both the ring leaf and the cover leaf.

13. The hinge of claim 6 wherein the base portion has a lower surface having thereon a flexible or compressible material engageable with the toilet bowl.

14. A toilet assembly comprising:
a toilet bowl;
a toilet seat; and
a hinge pivotally connecting the toilet seat to the toilet bowl, the hinge including
a base portion connected to the toilet bowl, the base portion being made of a relatively rigid material;
a leaf portion connected to the toilet seat, the leaf portion being made of a relatively rigid material; and
a living hinge portion pivotally connecting the base portion to the leaf portion, the living hinge portion being made of a material that is different from the material of the base portion and the material of the leaf portion and that is relatively flexible compared to the material of the base portion and the material of the leaf portion;
wherein the living hinge portion has thereon an axially-extending rib sealingly engaging the toilet seat and functioning as a flexible lip seal that conforms to the surface of the toilet seat to prevent any gaps.

15. The assembly of claim 14 wherein the base portion, the leaf portion and the living hinge portion are injection molded together, wherein the living hinge portion is made of a thermoplastic elastomer, and wherein the base portion and the leaf portion are made of a rigid thermoplastic.

16. A toilet assembly comprising:
a toilet bowl;
a toilet seat; and
a hinge pivotally connecting the toilet seat to the toilet bowl, the hinge including
a base portion connected to the toilet bowl, the base portion being made of a relatively rigid material;
a leaf portion connected to the toilet seat, the leaf portion being made of a relatively rigid material; and
a living hinge portion pivotally connecting the base portion to the leaf portion, the living hinge portion being made of a material that is different from the material of the base portion and the material of the leaf portion and that is relatively flexible compared to the material of the base portion and the material of the leaf;
wherein the leaf portion has opposite ends and an axial length extending between the ends, and wherein the living hinge portion separates the leaf portion from the base portion over a substantial part of the length of the leaf portion;
wherein the hinge further includes webs of relatively rigid material connecting the leaf portion to the base portion adjacent the ends of the leaf portion.

17. The assembly of claim 16 wherein the base portion, the leaf portion and the webs are made of a single mass of relatively rigid material and are injection molded together with the living hinge portion.

18. The assembly of claim 17 and further comprising a stepped interface between the living hinge portion and the leaf portion.

19. The assembly of claim 16 wherein the base portion, the leaf portion and the living hinge portion are injection molded together, wherein the living hinge portion is made of a thermoplastic elastomer, and wherein the base portion and the leaf portion are made of a rigid thermoplastic.

20. A toilet assembly comprising:
a toilet bowl;
a toilet seat; and
a hinge pivotally connecting the toilet seat to the toilet bowl, the hinge including
a base portion connected to the toilet bowl, the base portion being made of a relatively rigid material;
a leaf portion connected to the toilet seat, the leaf portion being made of a relatively rigid material; and
a living hinge portion pivotally connecting the base portion to the leaf portion, the living hinge portion being made of a material that is different from the material of the base portion and the material of the leaf portion and that is relatively flexible compared to the material of the base portion and the material of the leaf portion;

wherein the base portion has a lower surface having thereon a flexible or compressible material engaging the toilet bowl.

21. The assembly of claim 20 wherein the base portion, the leaf portion and the living hinge portion are injection molded together, wherein the living hinge portion is made of a thermoplastic elastomer, and wherein the base portion and the leaf portion are made of a rigid thermoplastic.

22. A toilet seat hinge comprising:
a base portion connectable to a toilet bowl, the base portion being made of a relatively rigid material;
a leaf portion connectable to a toilet seat, the leaf portion being made of a relatively rigid material; and
a living hinge portion pivotally connecting the base portion to the leaf portion, the living hinge portion being made of a material that is different from the material of the base portion and the material of the leaf portion and that is relatively flexible compared to the material of the base portion and the material of the leaf portion;
wherein the toilet seat includes a ring and a cover, and wherein the leaf portion includes a ring leaf connectable to the ring, and a cover leaf connectable to the cover, and wherein the living hinge portion pivotally connects the ring leaf to the base portion and pivotally connects the cover leaf to the base portion;
further comprising a stepped interface between the living hinge portion and each of the ring leaf and the cover leaf.

23. The hinge of claim 22 wherein the base portion, the leaf portion and the living hinge portion are injection molded together.

24. The hinge of claim 23 wherein the living hinge portion is made of a thermoplastic elastomer, and wherein the base portion and the leaf portion are made of a rigid thermoplastic.

25. The hinge of claim 22 wherein the living hinge portion is formed by a single mass of material connected to both the ring leaf and the cover leaf.

26. The hinge of claim 22 wherein the base portion has a lower surface having thereon a flexible or compressible material engageable with the toilet bowl.

27. A toilet assembly comprising:
a toilet bowl;
a toilet seat; and
a hinge pivotally connecting the toilet seat to the toilet bowl, the hinge including
a base portion connected to the toilet bowl, the base portion being made of a relatively rigid material;
a leaf portion connected to the toilet seat, the leaf portion being made of a relatively rigid material;
a living hinge portion pivotally connecting the base portion to the leaf portion, the living hinge portion being made of a material that is different from the material of the base portion and the material of the leaf portion and that is relatively flexible compared to the material of the base portion and the material of the leaf; and
a stepped interface between the living hinge portion and the leaf portion.

28. The assembly of claim 27 wherein the base portion, the leaf portion and the living hinge portion are injection molded together, wherein the living hinge portion is made of a thermoplastic elastomer, and wherein the base portion and the leaf portion are made of a rigid thermoplastic.

* * * * *